(12) United States Patent
Soper

(10) Patent No.: US 12,511,765 B2
(45) Date of Patent: Dec. 30, 2025

(54) MITIGATION OF REGISTRATION DATA OVERSAMPLING

(71) Applicant: INTUITIVE SURGICAL OPERATIONS, INC., Sunnyvale, CA (US)

(72) Inventor: Timothy D. Soper, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 509 days.

(21) Appl. No.: 17/914,562

(22) PCT Filed: Mar. 18, 2021

(86) PCT No.: PCT/US2021/023005
§ 371 (c)(1),
(2) Date: Sep. 26, 2022

(87) PCT Pub. No.: WO2021/194850
PCT Pub. Date: Sep. 30, 2021

(65) Prior Publication Data
US 2023/0162380 A1     May 25, 2023

Related U.S. Application Data

(60) Provisional application No. 63/001,169, filed on Mar. 27, 2020.

(51) Int. Cl.
*G06T 7/30*     (2017.01)
*G06T 7/20*     (2017.01)
*G06T 7/70*     (2017.01)

(52) U.S. Cl.
CPC ............ *G06T 7/30* (2017.01); *G06T 7/20* (2013.01); *G06T 7/70* (2017.01);
(Continued)

(58) Field of Classification Search
CPC .... G06T 7/30; G06T 7/20; G06T 7/70; G06T 2207/10028; G06T 2207/10068; G06T 2207/30061
See application file for complete search history.

(56) References Cited

U.S. PATENT DOCUMENTS 6,389,187 B1   5/2002   Greenaway et al.
7,772,541 B2   8/2010   Froggatt et al.
(Continued)

FOREIGN PATENT DOCUMENTS

WO   WO-2018144636 A1 *  8/2018   ....... A61B 1/000094

OTHER PUBLICATIONS

Fan, A new multi-resolution based method for estimating local surface roughness from point clouds, ISPRS Journal of Photogrammetry and Remote Sensing 144 (2018) 369-378 (Year: 2018).*
(Continued)

*Primary Examiner* — Utpal D Shah
*Assistant Examiner* — Lei Zhao
(74) *Attorney, Agent, or Firm* — Haynes & Boone, LLP.

(57) ABSTRACT

Disclosed are systems and methods for mitigating oversampling of data points collected by a medical device. In some aspects, a system is configured to receive data points of a sampled survey point cloud detected by a sensor of the medical device during surveying of an anatomic structure; determine, during the surveying, at least one parameter associated with (i) the medical device and/or (ii) the received data points detected by the sensor, including a change of translational and/or rotational motion of the medical device, a distance from a data point to a nearest neighbor within the sampled survey point cloud, or a density of the data points of a sub-set of the sampled survey point cloud corresponding to sub-region of the anatomic structure; analyze the parameter(s) by comparing it to a threshold; and
(Continued)

record individual data points in a registration point cloud when the analyzed parameter(s) satisfies the respective threshold.

20 Claims, 10 Drawing Sheets

(52) U.S. Cl.
CPC ............... *G06T 2207/10028* (2013.01); *G06T 2207/10068* (2013.01); *G06T 2207/30061* (2013.01)

(56) References Cited

U.S. PATENT DOCUMENTS

| | | | |
|---|---|---|---|
| 7,781,724 B2 | 8/2010 | Childers et al. | |
| 2006/0013523 A1 | 1/2006 | Childlers et al. | |
| 2007/0258074 A1* | 11/2007 | Moest | G03F 9/7092 355/53 |
| 2018/0240237 A1* | 8/2018 | Donhowe | A61B 34/10 |

OTHER PUBLICATIONS libpointmatcher, What the different data filters do? URL:https://web.archive.org/web/20180702005421/http:// libpointmatcher.readthedocs.io/en/latest/Datafilters/, 2018 (Year: 2018).*

Cross Validated, time series—Normalize Weights in fitting a curve—Cross Validated, https://stats.stackexchange.com/questions/378300/normalize-weights-in-fitting-a-curve, 2018 (Year: 2018).*

Anonymous, "What the different data filters do?—libpointmatcher," 2018, retrieved from the Internet at https://web.archive.org/web/20180702005421/http://libpointmatcher.readthedocs.io/en/latest/datafilters/), 20 pages.

Fan L et al., "A New Multi-resolution Based Method for Estimating Local Surface Roughness From Point Clouds," 2018, ISPRS Journal Of Photogrammetry and Remote Sensing, vol. 144, pp. 369-378.

Fan L et al., "An Iterative Coarse-to-Fine Sub-Sampling Method for Density Reduction of Terrain Point Clouds," 2019, Remote Sensing 11(8):947, 11 pages.

International Preliminary Report on Patentability for Application No. PCT/US2021/023005, mailed Oct. 6, 2022, 09 pages.

International Search Report and Written Opinion for Application No. PCT/US2021/023005, mailed on Jun. 30, 2021, 16 pages.

Tavares: Anderson C. M et al., "Assessing Losses for Point Set Registration" 2020, IEEE Robotics and Automation Letters, 5(2), pp. 3360-3367.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

MITIGATION OF REGISTRATION DATA OVERSAMPLING

CROSS-REFERENCE TO RELATED APPLICATIONS

This patent document is the U.S. National Stage patent application of International Patent Application No. PCT/US2021/023005 filed on Mar. 18, 2021 which claims priority to and the benefit of U.S. Provisional Application No. 63/001,169, titled "MITIGATION OF REGISTRATION DATA OVERSAMPLING", and filed Mar. 27, 2020. The entire content of the aforementioned patent applications are incorporated herein by reference as part of the disclosure of this patent document.

TECHNICAL FIELD

The present disclosure is directed to systems, devices, methods, and computer program products for registering instrument and image frames of reference.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions, an operator may insert minimally invasive medical tools to reach a target tissue location. Minimally invasive medical tools include instruments such as therapeutic, diagnostic, biopsy, and surgical instruments. Medical tools may be inserted into anatomic passageways and navigated toward a region of interest within a patient anatomy. Navigation may be assisted using images of the anatomic passageways. Improved systems and methods are needed to accurately perform registrations between medical tools and images of the anatomic passageways.

SUMMARY

Disclosed are devices, systems, methods, and computer program products for mitigating oversampling of data points collected by a medical device when steered to particular regions of an anatomic structure for surveying the anatomic structure, such as airways in regions of the lungs and bronchial tubes, e.g., in advance of a medical procedure.

In some embodiments, for example, a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with one or both of the detected position and the detected motion of the medical device; analyzing a set of the received data points to determine a motion parameter associated with a movement or change in position of the sensor of the medical device in a region of the anatomic passageway, wherein the motion parameter includes a change of one or both of a translational motion and a rotational motion of the sensor; comparing the motion parameter to a threshold to determine whether to accept the set of data points when the motion parameter satisfies the threshold or to reject the set of data points when the motion parameter does not satisfy the threshold; and recording the accepted set of data points in a survey point cloud usable to register the medical device in an anatomic frame of reference space.

In some embodiments, for example, a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a distance parameter associated with a distance between a data point and one or more nearest neighbors of the data point; comparing the distance parameter to a threshold to determine whether to accept the data point among the received data points when the distance parameter satisfies the threshold or to reject the data point among the received data points when the distance parameter does not satisfy the threshold; and recording accepted data points in a survey point cloud usable to register the medical device in an anatomic frame of reference space.

In some embodiments, for example, a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a density parameter associated with a density of one or more data points to nearest neighbors data points; comparing the density parameter to a threshold to determine whether to accept the one or more data points among the analyzed data points when the density parameter satisfies the threshold or to reject the one more data points when the density parameter does not satisfy the threshold; and recording accepted data points in a survey point cloud usable to register the medical device in an anatomic frame of reference space.

In some embodiments, for example, a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a density parameter associated with a density of one or more data points to nearest neighbors data points; comparing the density parameter to a threshold to determine whether to alter a weighting value of the one or more data points within the analyzed data points; when the density parameter meets the threshold, altering the weighting value of the one or more data points; and recording the data points to register the medical device in an anatomic frame of reference space.

It is to be understood that both the foregoing general description and the following details description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

Figure 1:
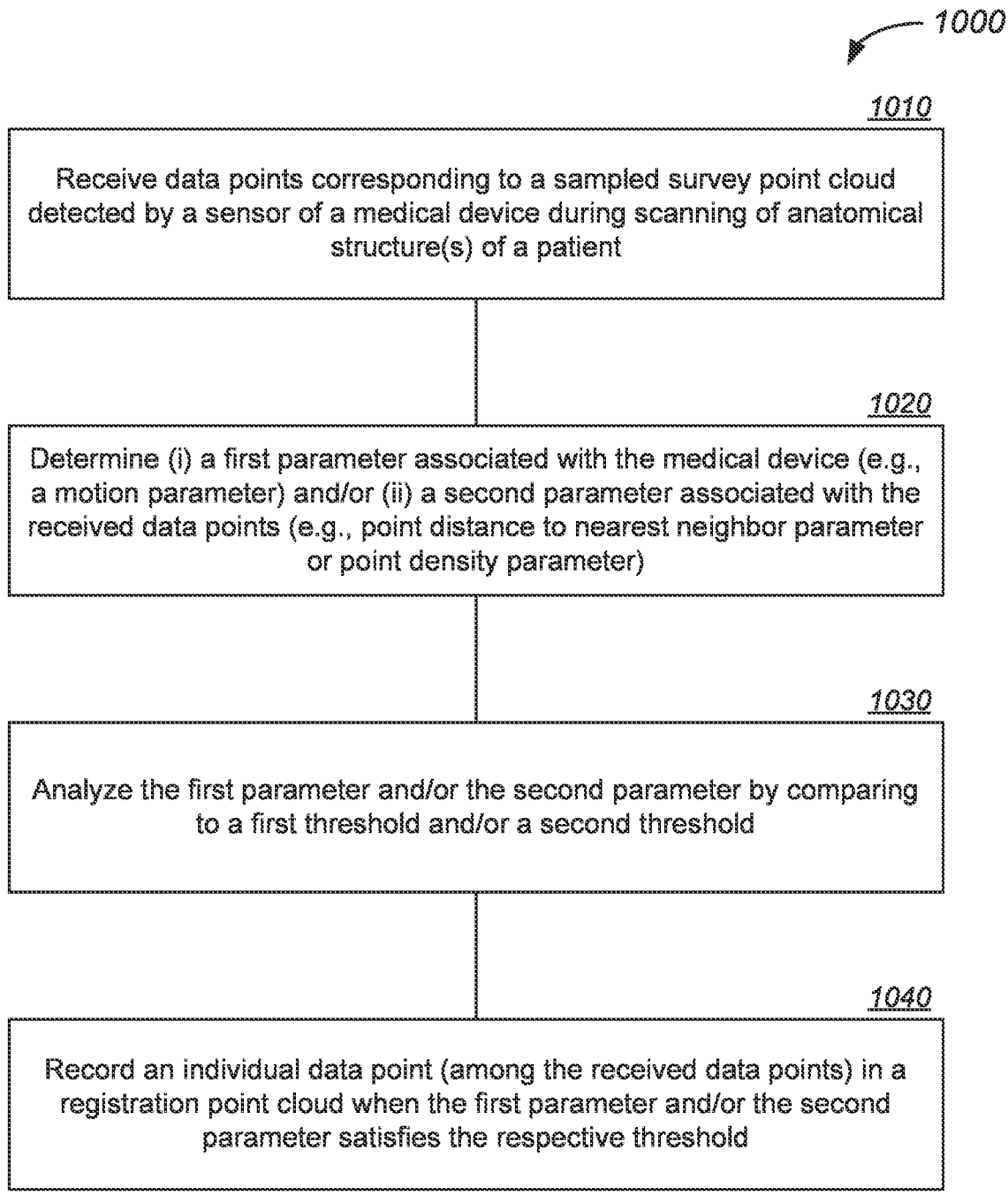
FIG. 1 shows a diagram illustrating a method for mitigating oversampling of data points in accordance with various embodiments of the present technology.

The system and techniques disclosed herein may be used to register a medical instrument reference frame to an image frame of reference for an intra-operative anatomic image that includes an image of the medical instrument, such as a catheter. Often, anatomical motion can result in intra-operative images that are too distorted to clearly isolate and segment the catheter and in medical instrument position data that is agitated. By representing the intra-operative image of the medical instrument as a cloud of points (also referred to as a "image point cloud") and the shape of the medical instrument (obtained by a sensor during the image capture period) as a cloud of points (also referred to as a "sensor point cloud"), point matching registration techniques, such as an iterative closest point (ICP) technique, can be used to register the sensor point cloud and the image point cloud. The robustness of this registration technique allows the image frame of reference to be registered to the medical instrument frame of reference, despite data spread caused by patient anatomical motion.

Specific details associated with several embodiments of the present technology are described herein, some with reference to FIGS. 1-12. Although some of the embodiments are described with respect to particular medical systems and devices in the context of navigating and performing medical procedures within lungs of a patient, other applications and other medical system and medical device embodiments in addition to or alternative to those described herein are within the scope of the present technology. For example, unless otherwise specified or made clear from context, the devices, systems, methods, and computer program products of the present technology can be used for various image-guided medical procedures, such as medical procedures performed on, in, or adjacent hollow patient anatomy, and, more specifically, in procedures for surveying, biopsying, ablating, or otherwise treating tissue within and/or proximal the hollow patient anatomy. Thus, for example, the systems, devices, methods, and computer program products of the present disclosure can be used in one or more medical procedures associated with other patient anatomy, such as the bladder, urinary tract, and/or heart of a patient.

It should be noted that other embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

As used herein, the term "physician" shall be understood to include any type of medical personnel who may be performing or assisting a medical procedure and, thus, is inclusive of a doctor, a nurse, a medical technician, other similar personnel, and any combination thereof. Additionally, or alternatively, as used herein, the term "medical procedure" shall be understood to include any manner and form of diagnosis, treatment, or both, inclusive of any preparation activities associated with such diagnosis, treatment, or both. Thus, for example, the term "medical procedure" shall be understood to be inclusive of any manner and form of movement or positioning of a medical device in an anatomical chamber. As used herein, the term "patient" should be considered to include human and/or non-human (e.g., animal) patients upon which a medical procedure is being performed.

Example Embodiments of Techniques for Mitigating Oversampling of Registration Data Point matching registration techniques, like ICP technique, used to register collected data points in a point cloud are generally robust, in that, implementations of such techniques can provide reliable registration data for establishing a frame of reference to track a medical instrument relative to the patient's anatomy within which it is inserted. However, any point matching technique, including ICP, are susceptible to some degree of error as a result of inaccuracy in the collected point sets. This is due to misalignments between the real anatomical structure of the patient's anatomy and a model of the anatomical structure that are inherent. Commonly, this error is the result of physical deformation (e.g., patient breathing, motion, shifting) relative to the previously-acquired model of the patient anatomy, e.g., created from previously-acquired data such as in a pre-operation image of the patient's anatomy to produce an initial model of the anatomical structure. This variability in physical deformation can result in variabilities in the level of misalignment in different parts of the anatomical structure. In general, an optimal registration is considered that which minimizes the misalignment between real and model-based reference frames.

Registration techniques such as ICP can mathematically compute this optimal alignment by minimizing the error between collected and model-based point sets. However, because ICP is susceptible to inherent physiological misalignments, the resulting error can be made worse by sampling processes that magnify or give more weight to some data over others. Such sampling processes can be affected by the way a medical instrument is manipulated to collect or sample point data from various regions. One example of worsening the error in point matching registration is "overdriving" of the insertable medical instrument where a sensor associated with the insertable medical instrument is used to disproportionally survey an area or areas of the patient's anatomy as compared to other areas. Overdriving results in the oversampling and over-representation of points for the over-surveyed areas, which causes undue weighting of the data points in the point matching registration process.

As an example, some medical systems may implement a registration protocol that requires the system user to position the sensor (e.g., associated with the system's insertable medical device) in a plurality of anatomic regions. The registration protocol facilitates the collection of data points for a point cloud to be registered with a global data set (e.g., created from a pre-procedural image), referred to as "survey data." For example, the registration protocol may request or require the system user to move the medical device with the associated sensor device to a first area of the anatomic structure (e.g., determined from the pre-procedural image), to a second area, to a third area, and so forth. However, the medical system may have little to no control on where, when or how the system user "drives" the medical device with the associated sensor device during the registration protocol, which makes the registration prone to oversampling data in regions of the anatomic structure where the user may "overdrive" the device more frequently with respect to other regions of interest. This may cause inaccuracies in the registration of survey data with the global data set.

One way to deal with this issue is to not collect any survey data when the medical device is stationary and only collect data when the medical device is in motion relative to the anatomic structure. However, this technique is insufficient as data would still be oversampled when the device is moved repetitively by the user in a given area of the anatomic structure. What is needed is an effective and convenient (e.g., non-taxing of computing resources) way to mitigate oversampling of survey data when a medical device performs registration.

In some embodiments in accordance with the present technology, a computer-implemented method for mitigating oversampling of data points collected by a sensor associated with a medical device includes analyzing (i) parameter(s) of the sensor (of the medical device) and (ii) parameter(s) of the sampled data points, and, in real-time, comparing one or both of the analyzed sensor parameter(s) and/or data point parameter(s) to a threshold value, respectively, where individual data points among the sampled data points are recorded in a registration point cloud when the respective parameter(s) satisfies the threshold. An example embodiment of such a method is described in connection with FIG. 1.

FIG. 1, for example, is a flow diagram illustrating a method 1000 for mitigating oversampling of data points in accordance with various embodiments of the present technology. Various embodiments of the method 1000 can be based on a point sampling technique to mitigate oversampling and/or on a density normalization technique to mitigate oversampling. All or a subset of the steps of the method 1000 can be implemented by a computing device, such as a control system of a medical system or device, including various components or devices of a robotic or teleoperated system. The method 1000 includes a set of operations or processes 1010-1040.

The computing device for implementing the method 1000 includes one or more processors coupled to one or more memory devices storing instructions that, when executed by the one or more processors, cause the computing device to perform operations in accordance with the processes 1010-1040. In some implementations where the computing device is included in a robotic or teleoperated medical system, the computing device is in data communication with a medical instrument system, which includes the medical device and the sensor, and receives sensor data for mitigating oversampling of data points. The sensor is configured to generate position sensor data and/or motion sensor data during a registration protocol where the medical device is driven in an anatomical structure or structures of the patient (e.g., driven through anatomic passageway(s) of the patient). In this manner, the position sensor data is associated with one or more positions of the medical device within the anatomic passageway, and the motion sensor data is associated with the translational motion and/or the rotational motion of the medical device within the anatomic passageway. Optionally, in some embodiments, the medical instrument system includes an image capture device configured to capture image data of patient anatomy within the anatomic passageway during the data sampling of the anatomic structure(s). The method 1000 is described below with reference to an exemplary robotic or teleoperated medical system 100 ("medical system 100"), discussed later in connection with FIGS. 6 and 7.

Figure 6:
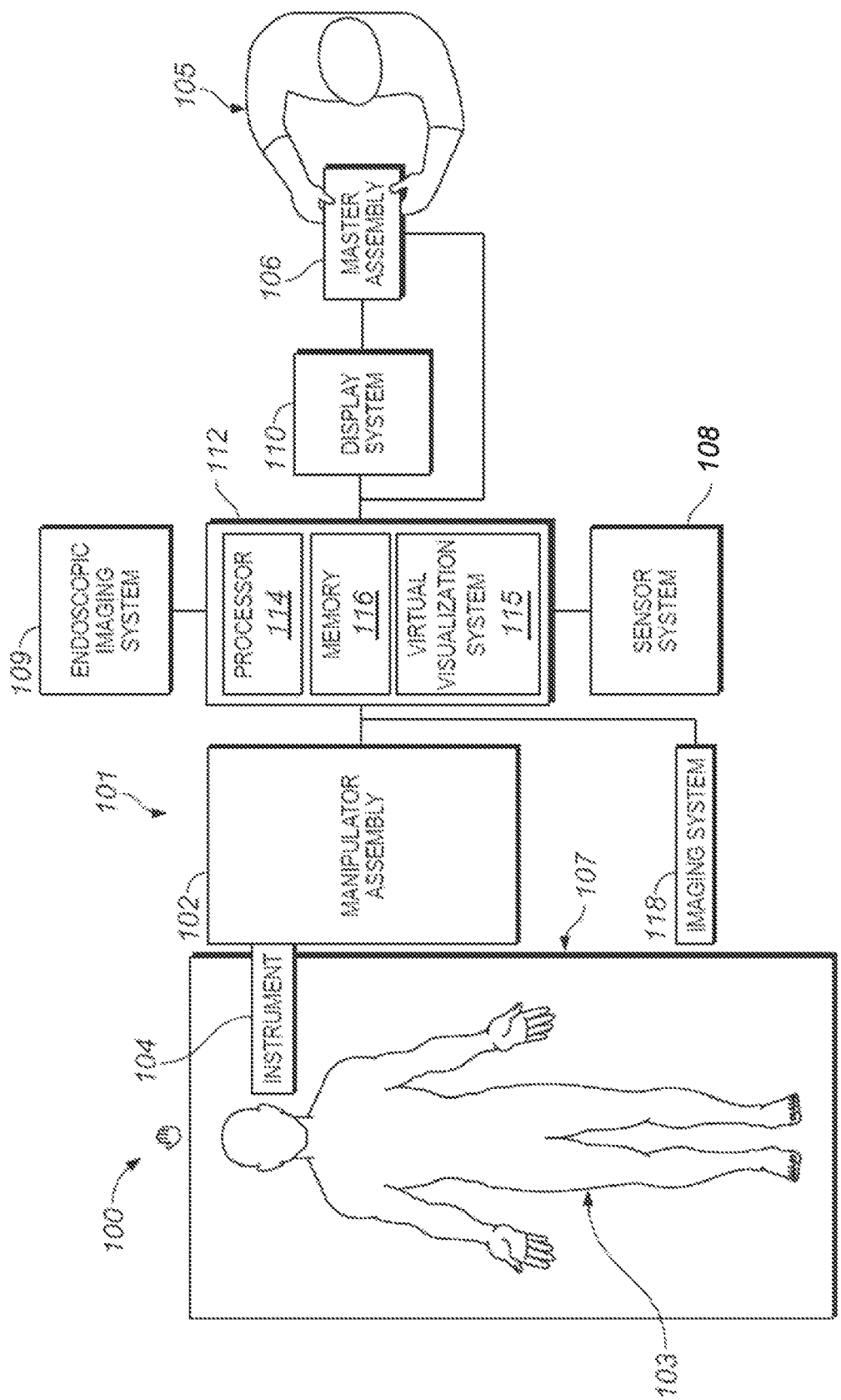
FIG. 6 shows a schematic diagram of a robotic or teleoperated medical system configured in accordance with various embodiments of the present technology.
Figure 7:
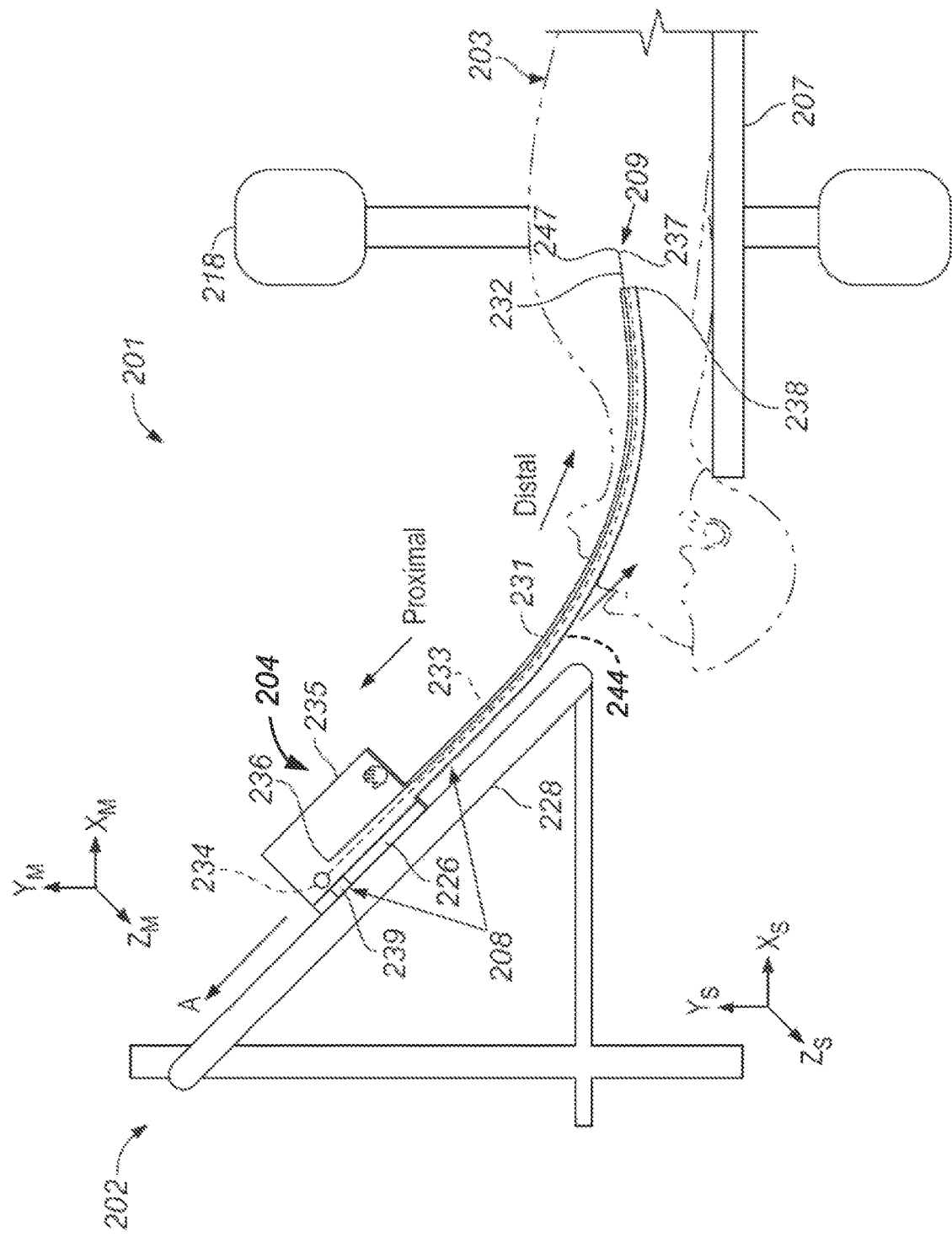
FIG. 7 shows a schematic diagram of a manipulator assembly, a medical instrument system, and an imaging system configured in accordance with various embodiments of the present technology.

At process 1010, the method 1000 receives, at the computing device, data points that correspond to a sampled survey point cloud detected by a sensor of a medical device (e.g., the shape sensor 233 and/or of the position measuring device 239 of the medical instrument system 204 shown in FIGS. 6 and 7) during data sampling by the sensor of an anatomic structure or structures of a patient. The received data points at the computing device can be associated with a position and/or a motion of the sensor, e.g., thereby of the medical device.

At process 1020, the method 1000 determines, at the computing device, a first parameter associated with the medical device (e.g., the sensor and/or other component of the medical device) and/or a second parameter associated with the received data points. In some implementations of the process 1020, the first parameter includes a motion parameter associated with the medical device. In such implementations, determining the first parameter can include determining a change of the translational motion and/or rotational motion of the medical device, such as a change in a roll value or a pitch value and/or a yaw value of the sensor of the medical device (e.g., such as the medical instrument system 204, at the tip of the shape sensor 233). In some implementations of the process 1020, the second parameter can include a point distance parameter and/or a point density parameter associated with the received data points. In such implementations, determining the second parameter can include determining (i) a distance from a data point to its nearest neighbor within the sampled survey point cloud, and/or (ii) a density of the data points, e.g., within a predefined subset of the sampled survey point cloud corresponding to a sub-region of the anatomic structure. One, some or all of the above example features may be implemented by the process 1020.

At process 1030, the method 1000 analyzes, at the computing device, the first parameter and/or the second parameter by comparing the first parameter to a first threshold and/or by comparing the second parameter to a second threshold, respectively. For example, the first threshold and second threshold can each include a threshold value or range of values. As an example, the first threshold value or range of values can include a velocity (or velocity range) that the sensor exhibited by movement from the previous sample. As another example, the second threshold value or range of values can include a minimum distance or distance range that the sensor was translated or rotated from the previous sample, e.g., the previous sample taken temporally. In some implementations of the process 1030, where the second parameter includes a determined distance from a data point to its nearest neighbor within the sampled survey point cloud, the determined distance can be compared to a distance threshold. In some implementations of the process 1030, where the second parameter includes a determined density value of data points, the determined density value can be compared to a density threshold. One, some or all of the above example features may be implemented by the process 1030.

At process 1040, the method 1000 records, at the computing device, an individual data point (among the received data points) in a registration point cloud when the first parameter and/or the second parameter satisfies the respective threshold. In this manner, for example, the identified individual data point(s) from the received data points can be added to the recorded coordinate points that form positional point cloud data representing a shape of the medical device within an anatomic region. In some implementations of the process 1040, the received data points are initially recorded in the registration point cloud, after which the process 1040 rejects any individual data point when the determined second parameter satisfies the threshold value. Yet, in some implementations of the process 1040, the process 1040 includes only adding an individual data point when the determined second parameter satisfies the threshold value. Yet, in some implementations, prior to recording the individual data points, the process 1040 can be implemented to decrease a weighting value of a data point when the determined density of data points (as the second parameter) exceeds a threshold density.

In some embodiments, the method 1000 provides a motion collection-based technique for mitigation of oversampled data. Whereas, in some embodiments, the method 1000 provides a point distance rejection-based technique for mitigation of oversampled data. Yet, in some embodiments, the method 1000 provides a point density rejection-based technique for mitigation of oversampled data.

Figure 2:
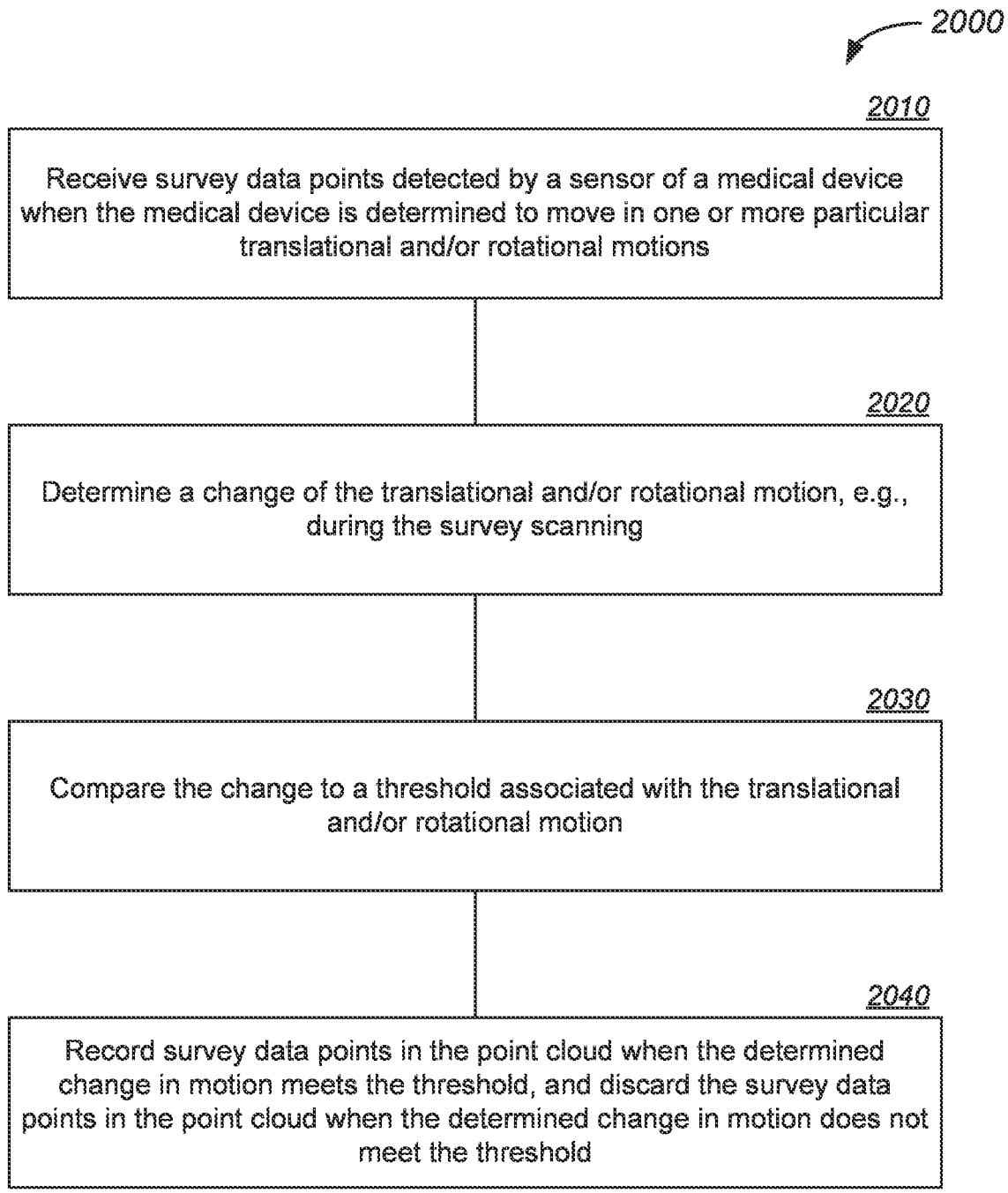
FIG. 2 shows a diagram illustrating an example motion collection-based method for mitigating oversampled data in accordance with various embodiments of the method of FIG. 1.

FIG. 2 is a flow diagram depicting an example of a motion collection-based oversampling mitigation method 2000 in accordance with some embodiments of the method 1000. For example, the method 2000 can be used to limit the collection of survey data until motor encoder values from either 10 or pitch/yaw have changed enough to qualify as motion of the medical device, such as a catheter. All or a subset of the steps of the method 2000 can be implemented by the computing device, e.g., such as the control system 112 of the medical system 100 described later, or various other components or devices of a robotic or teleoperated system. In various implementations of the method 2000, for example, the sensor can include the shape sensor 233 and/or the position measuring device 239 of the medical instrument system 204, and the method 2000 can be implemented during surveying of an anatomic structure or structures of a patient, such as in a registration protocol during an implementation of the sensor system 208.

At process 2010, the method 2000 receives survey data points detected by the sensor of the medical device (e.g., shape sensor 233) for determining when the medical device is moved in one or more particular translational and/or rotational motions, e.g., roll motion (delta ϕ) or pitch or yaw motions. During surveying by the sensor (process 2010), the method 2000 includes a process 2020 to determine a change of the translational and/or rotational motion (e.g., delta 10 or pitch/yaw values). At process 2030, the method compares the change to a threshold (e.g., threshold value or range of values) associated with the translational and/or rotational motion. At process 2040, the method 2000 records survey data points in the point cloud when the determined change in motion meets the threshold, and not record (e.g., discard) the survey data points in the point cloud when the determined change in motion does not meet the threshold. In this manner, for example, the method 2000 can limit the collection of survey data that will be included in the point cloud based on the sensor (e.g., encoder) values of a particular magnitude, such as a substantial change in IO or pitch/yaw, to qualify as motion of the medical device within the anatomic region during registration—not just simple movement of the medical device.

In an example implementation of the method 2000, the shape sensor 233 and/or the position measuring device 239 of the medical instrument system 204 is driven in one or multiple anatomic passageways of the patient. At the process 2010, the control system 112 of the medical system 100 receives all of the data generated by the shape sensor 233 and/or the position measuring device 239. At the process 2020, the control system 112 determines whether there is a change in movement and/or position of the shape sensor 233 and/or the position measuring device 239; and if there is a determined change, the control system 112 determines a value of the change, i.e., a delta of the movement and/or a delta of the position. If no change is determined, the control system 112 assigns a delta of zero to the movement and/or position parameter (e.g., the first parameter). At the process 2030, the control system 112 compares the determined value of the change to a threshold value (or range of threshold values) for determining whether to accept or reject the received survey data sampled from the medical instrument system 204. In one non-limiting example, the threshold value is 0.5 mm in a position change from the previously collected point. The threshold value (or threshold range) can be predetermined and stored in the memory of the control system 112. At the process 2040, the control system 112 records the survey data points in the point cloud when it is determined at the process 2030 that the determined value of the change meets the threshold value. For example, when the delta is zero or less than the threshold (or outside of any threshold range), the survey data will be rejected at the process 2040. For example, when the delta is at or greater than the threshold (or within a threshold range), the survey data will be accepted at the process 2040. In this manner, the method 2000 mitigates potential oversampling by the system 100 by using only the accepted data to register the medical instrument system 204 in anatomic space (e.g., which corresponds with an image space from a pre-operation image).

Figure 3:
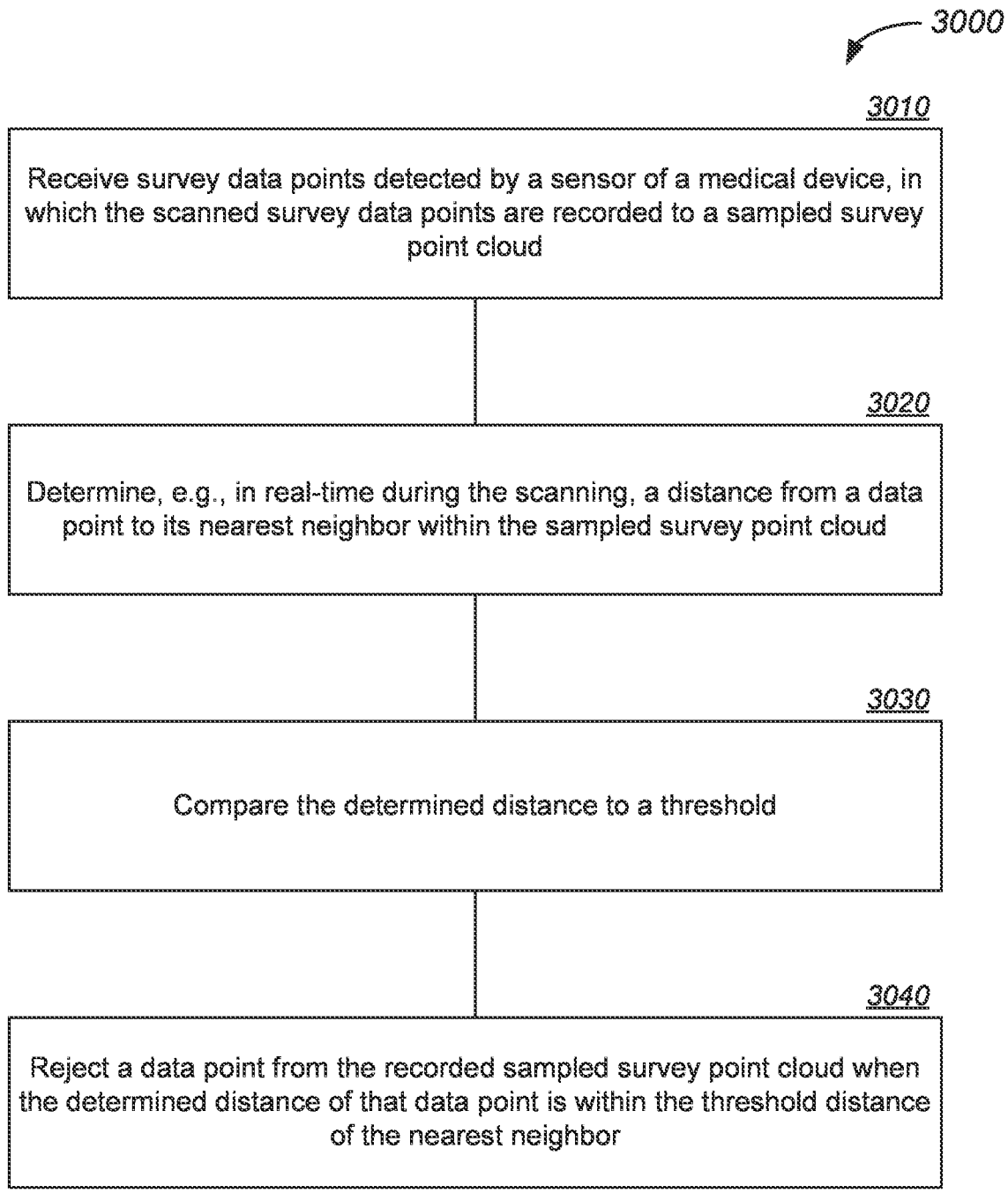
FIG. 3 shows a diagram illustrating an example point distance rejection-based method for mitigating oversampled data in accordance with various embodiments of the method of FIG. 1.

FIG. 3 is a flow diagram depicting an example of a point distance rejection-based oversampling mitigation method 3000 in accordance with some embodiments of the method 1000. All or a subset of the steps of the method 3000 can be implemented by the computing device, such as the control system 112 of the medical system 100, or various other components or devices of a robotic or teleoperated system. In various implementations of the method 3000, for example, the sensor can include the shape sensor 233 and/or of the position measuring device 239 of the medical instrument system 204, and the method 3000 can be implemented during surveying of an anatomic structure or structures of a patient, e.g., such as in a registration protocol during an implementation of the sensor system 208.

At process 3010, the method 3000 receives survey data points detected by the sensor of the medical device (e.g., shape sensor 233 at tip and/or body), which are recorded to a sampled survey point cloud. At process 3020, the method 3000 determines, e.g., in real-time during surveying by the sensor (e.g., at process 3010), a distance from a data point to its nearest neighbor within the sampled survey point cloud. At process 3030, the method 3000 compares the determined distance to a threshold distance, e.g., threshold distance value or range of distance values. At process 3040, the method 3000 rejects a data point from the recorded sampled survey point cloud when the determined distance of that data point is within the threshold distance of the nearest neighbor. In this manner, for example, the method 3000 adds the surveyed data points to the point cloud and rejects those data points whose distance are determined to be too close to nearest neighbors, e.g., in a real-time evaluation during a registration protocol of the medical device.

In an example implementation of the method 3000, the shape sensor 233 and/or the position measuring device 239 of the medical instrument system 204 is driven in one or multiple anatomic passageways of the patient. At the process 3010, the control system 112 of the medical system 100 receives all of the data generated by the shape sensor 233 and/or the position measuring device 239 and initially records all of the data to the point cloud. At the process 3020, the control system 112 examines at least a set of the recorded data to the point cloud by determining a distance of a data point or data points within the set to other nearest neighbor data points within the set. At the process 3030, the determined distance between each data point and its nearest neighbors is compared to a threshold (e.g., a threshold value or a threshold range), e.g., which provides the control system 112 with a 'degree of closeness' of the data point to its nearest neighbors. In implementations of the processes 3020 and 3030, for example, the control system 112 can calculate a set of K nearest neighbor distances and evaluate the point using any number of nearest neighbors. In one case, the number of nearest neighbors, K, may be specified by the user or software. Alternatively, the number of nearest neighbors may be determined as the set of all points that lie within a specified distance from the point in question. At the process 3040, the data points determined to be 'too close' to their nearest neighbors (i.e., its distance is within the threshold distance of its nearest neighbor(s)), are rejected from the point cloud.

Figure 4:
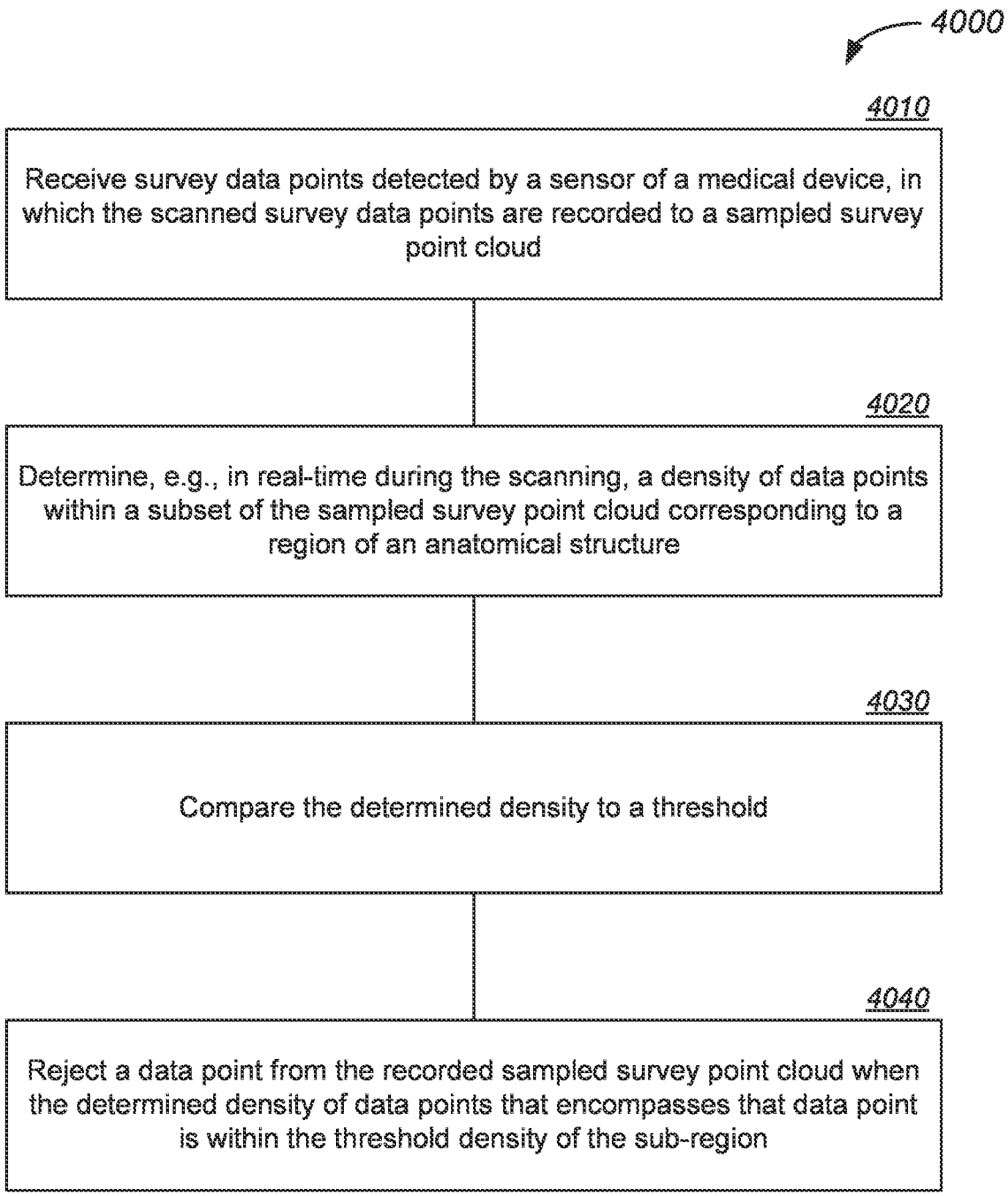
FIG. 4 shows a diagram illustrating an example point density rejection-based method for mitigating oversampled data in accordance with various embodiments of the method of FIG. 1.

FIG. 4 is a flow diagram depicting an example of a point density rejection-based oversampling mitigation method, 4000 in accordance with some embodiments of the method 1000. All or a subset of the steps of the method 4000 can be implemented by the computing device, such as the control system 112 of the medical system 100, or various other components or devices of a robotic or teleoperated system. In various implementations of the method 4000, for example, the sensor can include the shape sensor 233 and/or of the position measuring device 239 of the medical instrument system 204, and the method 4000 can be implemented during surveying of an anatomic structure or structures of a patient, e.g., such as in a registration protocol during an implementation of the sensor system 208.

At process 4010, the method 4000 receives survey data points detected by the sensor of the medical device (e.g., shape sensor 233 at tip and/or body), which are recorded to a sampled survey point cloud. At process 4020, the method 4000 determines, e.g., in real-time during surveying by the sensor (e.g., at process 4010), a density of the data points, e.g., within a subset of the sampled survey point cloud corresponding to a sub-region of the anatomic structure (e.g., predefined subset). At process 4030, the method 4000 compares the determined density to a threshold density, e.g., threshold density value or range of density values. At process 4040, the method 4000 rejects a data point from the recorded sampled survey point cloud when the determined density of data points (that encompasses that data point) is within the threshold density of the sub-region. In this manner, for example, the method 4000 adds the surveyed data points to the point cloud and rejects them in real-time upon evaluation with respect to a point density threshold, e.g., which can be a point density threshold within a region or regions (of various sizes, e.g., predefined) of the anatomic structure.

In an example implementation of the method 4000, the shape sensor 233 and/or the position measuring device 239 of the medical instrument system 204 is driven in one or multiple anatomic passageways of the patient. At the process 4010, the control system 112 of the medical system 100 receives all of the data generated by the shape sensor 233 and/or the position measuring device 239 and initially records all of the data to the point cloud. At the process 4020, the control system 112 begins examining the density of data points within a set of the recorded data to the point cloud. For example, at process 4020, the control system 112 determines a density of data points within the set that includes an analysis of the data points within the set with respect to their nearest neighbor data points. At the process 4030, the determined density of data points within the set is compared to a threshold (e.g., a threshold value or a threshold range), e.g., which provides the control system 112 with a 'degree of denseness' of the data points with respect to their nearest neighbors within the set. In implementations of the processes 4020 and 4030, for example, the control system 112 can calculate a set of K nearest neighbor distances and evaluate each point using any number of nearest neighbors. When the set is determined to be 'too dense' within data points, the control system 112 can reject data point(s) to mitigate the oversampling. At the process 4040, the data points determined to be in a 'dense set' with respect to their nearest neighbors are rejected from the point cloud.

Figure 5:
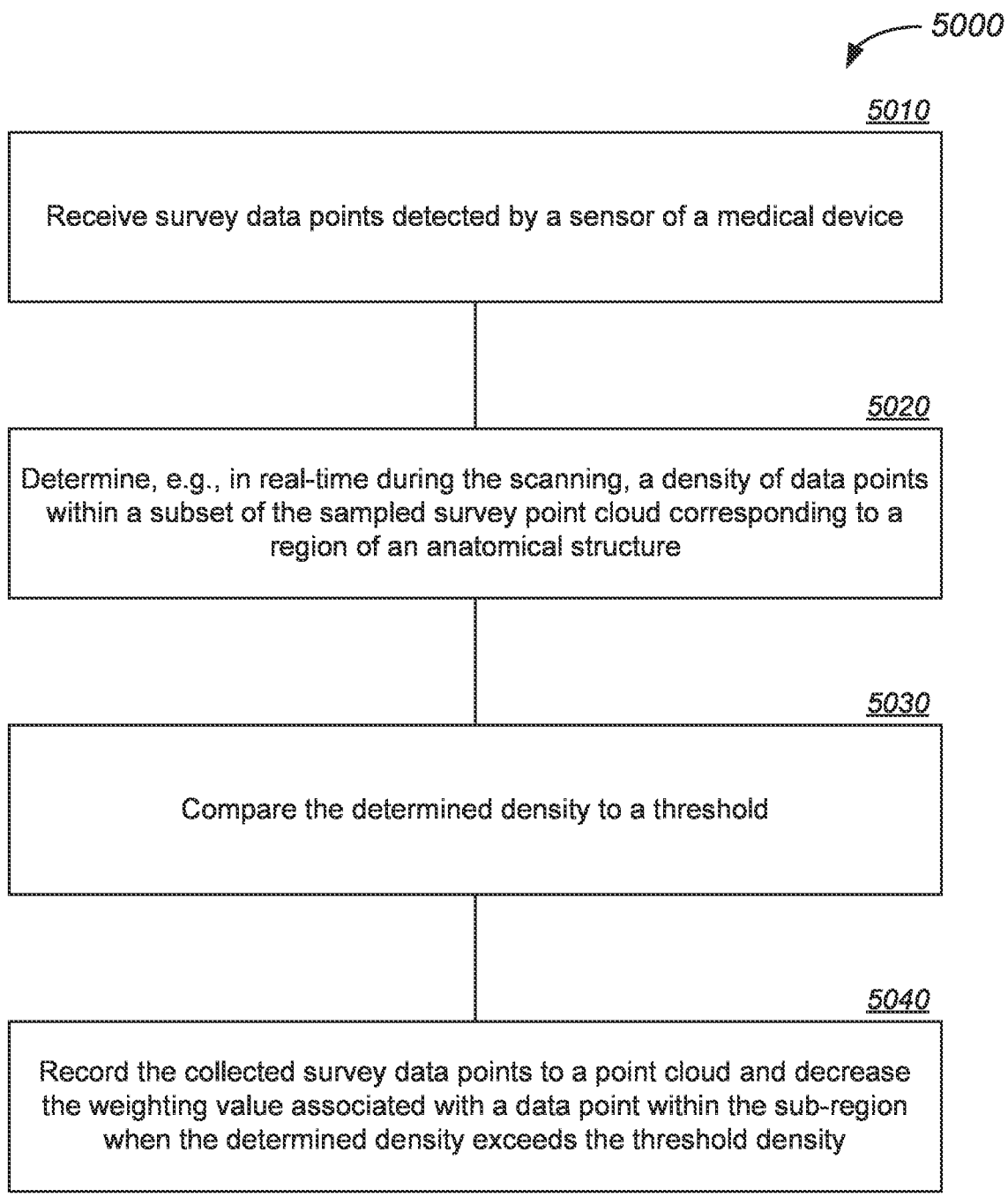
FIG. 5 shows a diagram illustrating a survey density normalization-based method for mitigating oversampled data in accordance with various embodiments of the method of FIG. 1.

FIG. 5 is a flow diagram depicting an example of a survey density normalization-based oversampling mitigation method 5000 in accordance with some embodiments of the method 1000. Like the methods described above, all or a subset of the steps of the method 5000 can be implemented by a computing device, such as the control system 112 of the medical system 100, or various other components or devices of a robotic or teleoperated system. In various implementations of the method 5000, the sensor can include the shape sensor 233 and/or of the position measuring device 239 of the medical instrument system 204, and the method 5000 can be implemented during surveying of an anatomic structure or structures of a patient, e.g., such as in a registration protocol during an implementation of the sensor system 208.

In some examples of the method 5000, survey data points would be collected by the sensor, but certain data points might be removed if over-sampled in a given region. For example, a straight-forward approach would be to keep all points but to decrease the per-point weighting within densely surveyed regions, which can be implemented as an augmentation to the ICP algorithm because weighting is already a variable employed by standard ICP algorithms. Within an example ICP algorithm, a registration is computed at each step using the cumulative set of nearest-neighbor matches between the surveyed point cloud and the comparative data set of the anatomic structure, e.g., a pre-operative image data set of an airway tree. In implementations of the method 5000, for example, by reducing the weighting applied to point matches within a given region, the method can effectively down-weight or correct for over-sampling in that region. The method 5000 includes a set of operations or processes 5010-5040 described below.

At process 5010, the method 5000 receives survey data points detected by the sensor of the medical device (e.g., shape sensor 233), which can be recorded to a sampled survey point cloud based on the outcomes of the processes 5020 and 5030. At process 5020, the method 5000 determines, e.g., in real-time during surveying by the sensor (e.g., at process 5010), a density of the data points, e.g., within a subset of the sampled survey point cloud corresponding to a sub-region of the anatomic structure (e.g., predefined subset). In some implementations of the process 5010, for example, the determined density is based on distance parameters from medical device's location within the anatomic region. At process 5030, the method 5040 compares the determined density to a threshold density for the sub-region, e.g., threshold density value or range of density values.

The method 5000 includes a process 5040 to (i) record the collected survey data points to the survey point cloud and (ii) decrease the weighting value associated with a data point within the sub-region when the determined density exceeds the threshold density (e.g., referred to as oversampled sub-region). In some implementations of the process 5040, for example, the weighting value is normalized for weighting values associated with data points in the over-sampled sub-region, where the normalization process includes dividing weighting by total number of matches to nearest survey points. As an illustrative example, the process 5040 can be implemented where the weighting would be normalized such that points in the anatomic structures, like the pulmonary airway tree, that are nearest to multiple survey points would have their weighting divided by the total number of matches. In some examples, matches could be down-weighted or up-weighted depending on the local density of points. In such cases, for example, the density can be computed based on the number of survey points in a given volume.

Yet, in some implementations of the process 5040, the weighting value is normalized by smoothing data points along a length line traversing at least a portion of the over-sampled sub-region. As an illustrative example, the process 5040 can be implemented where the density is normalized by computing the number of matches that occur along a given length of the anatomic structure (e.g., an airway in a pulmonary airway tree). In such a case, for example, larger areas of over-sampling can be smoothed out by normalizing the local weighting density of all survey points along each airway. The result would be that the registration is balanced over the total length of driven airways.

Embodiments of Robotic or Teleoperated Medical Systems for Implementing the Disclosed Methods FIG. 6 is a schematic representation of a robotic or teleoperated medical system 100 ("medical system 100") configured in accordance with various embodiments of the present technology. As shown, the medical system 100 includes a manipulator assembly 102, a medical instrument system 104, a master assembly 106, and a control system 112. The manipulator assembly 102 supports the medical instrument system 104 and drives the medical instrument system 104 at the direction of the master assembly 106 and/or the control system 112 to perform various medical procedures on a patient 103 positioned on a table 107 in a surgical environment 101. In this regard, the master assembly 106 generally includes one or more control devices that can be operated by an operator 105 (e.g., which can be a physician) to control the manipulator assembly 102. Additionally, or alternatively, the control system 112 includes a computer processor 114 and at least one memory 116 for effecting control between the medical instrument system 104, the master assembly 106, and/or other components of the medical system 100. The control system 112 can also include programmed instructions (e.g., a non-transitory computer-readable medium storing the instructions) to implement any one or more of the methods described herein, including instructions for providing information to a display system 110 and/or processing data for registration of the medical instrument 104 for various medical procedures on the patient by the medical system 100 (as described in greater detail below). The manipulator assembly 102 can be a teleoperated, a non-teleoperated, or a hybrid teleoperated and non-teleoperated assembly. Thus, all or a portion of the master assembly 106 and/or all or a portion of the control system 112 can be positioned inside or outside of the surgical environment 101.

In some embodiments, to aid the operator 105 in controlling the manipulator assembly 102 and the medical instrument system 104, the medical system 100 further includes a sensor system 108, an endoscopic imaging system 109, an imaging system 118, a virtual visualization system 115, and/or the display system 110. In some embodiments, the sensor system 108 includes a position/location sensor system (e.g., an electromagnetic (EM) sensor system) and/or a shape sensor system for determining position, orientation, speed, velocity, pose, and/or shape of the medical instrument system 104 (e.g., while the medical instrument system 104 is within the patient 103). In these and other embodiments, the endoscopic imaging system 109 includes one or more image capture devices (not shown) (e.g., such as an imaging scope assembly and/or an imaging instrument) that records endoscopic image data, including concurrent or real-time images (e.g., video, still images, etc.) of patient anatomy. Images captured by the endoscopic imaging system 109 may be, for example, two or three-dimensional images of patient anatomy captured by an imaging instrument positioned within the patient 103, and are referred to hereinafter as "real navigational images."

In some embodiments, the medical instrument system 104 may include components of the sensor system 108 and/or of the endoscopic imaging system 109. For example, components of the sensor system 108 and/or components of the endoscopic imaging system 109 can be integrally or removably coupled to the medical instrument system 104. Additionally, or alternatively, the endoscopic imaging system 109 can include a separate endoscope (not shown) attached to a separate manipulator assembly (not shown) that can be used in conjunction with the medical instrument system 104 to image patient anatomy. The sensor system 108 and/or the endoscopic imaging system 109 may be implemented as hardware, firmware, software, or a combination thereof that interact with or are otherwise executed by one or more computer processors, such as the computer processor(s) 114 of the control system 112.

The imaging system 118 of the medical system 100 may be arranged in the surgical environment 101 near the patient 103 to obtain real-time and/or near real-time images of the patient 103 before, during, and/or after a medical procedure. In some embodiments, the imaging system 118 includes a mobile C-arm cone-beam computerized tomography (CT) imaging system for generating three-dimensional images. For example, the imaging system 118 can include a DynaCT imaging system from Siemens Corporation or another suitable imaging system. In these and other embodiments, the imaging system 118 can include other imaging technologies, including magnetic resonance imaging (MRI), fluoroscopy, thermography, ultrasound, optical coherence tomography (OCT), thermal imaging, impedance imaging, laser imaging, nanotube X-ray imaging, and/or the like.

In these and other embodiments, the control system 112 further includes the virtual visualization system 115 to provide navigation assistance to the operator 105 when controlling the medical instrument system 104 during an image-guided medical procedure. For example, virtual navigation using the virtual visualization system 115 can be based upon reference to an acquired pre-operative or intra-operative dataset (e.g., based upon reference to data generated by the sensor system 108, the endoscopic imaging system 109, and/or the imaging system 118) of anatomic passageways of the patient 103. In some implementations, for example, the virtual visualization system 115 processes image data of the patient anatomy captured using the imaging system 118 (e.g., to generate an anatomic model of an anatomic region of the patient 103). The virtual visualization system 115 can register the image data and/or the anatomic model to data generated by the sensor system 108 and/or to data generated by the endoscopic imaging system 109 to (i) determine position, pose, orientation, shape, and/or movement of the medical instrument system 104 within the anatomic model (e.g., to generate a composite virtual navigational image), and/or (ii) determine a virtual image (not shown) of patient anatomy from a viewpoint of the medical instrument system 104 within the patient 103. For example, the virtual visualization system 115 can register the anatomic model to positional sensor data generated by the positional sensor system 108 and/or to endoscopic image data generated by the endoscopic imaging system 109 to (i) map the tracked position, orientation, pose, shape, and/or movement of the medical instrument system 104 within the anatomic region to a correct position within the anatomic model, and/or (ii) determine a virtual navigational image of virtual patient anatomy of the anatomic region from a viewpoint of the medical instrument system 104 at a location within the anatomic model corresponding to a location of the medical instrument system 104 within the patient 103.

The display system 110 can display various images or representations of patient anatomy and/or of the medical instrument system 104 that are generated by the sensor system 108, by the endoscopic imaging system 109, by the imaging system 118, and/or by the virtual visualization system 115. In some embodiments, the display system 110 and/or the master assembly 106 may be oriented so the operator 105 can control the manipulator assembly 102, the medical instrument system 104, the master assembly 106, and/or the control system 112 with the perception of telepresence.

As discussed above, the manipulator assembly 102 drives the medical instrument system 104 at the direction of the master assembly 106 and/or the control system 112. In this regard, the manipulator assembly 102 can include select degrees of freedom of motion that may be motorized and/or teleoperated and select degrees of freedom of motion that may be non-motorized and/or non-teleoperated. For example, the manipulator assembly 102 can include a plurality of actuators or motors (not shown) that drive inputs on the medical instrument system 104 in response to commands from the control system 112. The actuators can include drive systems (not shown) that, when coupled to the medical instrument system 104, can advance the medical instrument system 104 into a naturally or surgically created anatomic orifice. Other drive systems may move a distal portion (not shown) of the medical instrument system 104 in multiple degrees of freedom, which may include three degrees of linear motion (e.g., linear motion along the X, Y, Z Cartesian axes) and three degrees of rotational motion (e.g., rotation about the X, Y, Z Cartesian axes). Additionally, the actuators can be used to actuate an articulable end effector of the medical instrument system 104 (e.g., for grasping tissue in the jaws of a biopsy device and/or the like).

FIG. 7 is a schematic representation of a manipulator assembly 202, a medical instrument system 204, and an imaging system 218 in a surgical environment 201 and configured in accordance with various embodiments of the present technology. In some embodiments, the manipulator assembly 202, the medical instrument system 204, and/or the imaging system 218 are the manipulator assembly 102, the medical instrument system 104, and/or the imaging system 118, respectively, of FIG. 6. As shown, the surgical environment 201 illustrated in FIG. 7 has a surgical frame of reference ($X_S$, $Y_S$, $Z_S$) in which a patient 203 is positioned on a table 207, and the medical instrument system 204 illustrated in FIG. 7 has a medical instrument frame of reference ($X_M$, $Y_M$, $Z_M$) within the surgical environment 201. During the medical procedure, the patient 203 may be stationary within the surgical environment 201 in the sense that gross patient movement can be limited by sedation, restraint, and/or other means. In these and other embodiments, cyclic anatomic motion of the patient 203, including respiration and cardiac motion, may continue unless the patient 203 is asked to hold his or her breath to temporarily suspend respiratory motion.

The manipulator assembly 202 includes an instrument carriage 226 mounted to an insertion stage 228. In some embodiments, the insertion stage 228 is fixed within the surgical environment 201. Alternatively, the insertion stage 228 can be movable within the surgical environment 201 but have a known location (e.g., via a tracking sensor or other tracking device) within the surgical environment 201. In these alternatives, the medical instrument frame of reference ($X_M$, $Y_M$, $Z_M$) is fixed or otherwise known relative to the surgical frame of reference ($X_S$, $Y_S$, $Z_S$). In the illustrated embodiment, the insertion stage 228 is linear, while in other embodiments, the insertion stage 228 is curved or has a combination of curved and linear sections.

The medical instrument system 204 of FIG. 7 includes an elongate device 231, a medical instrument 232, an instrument body 235, a sensor system 208, and an endoscopic imaging system 209. In some embodiments, the elongate device 231 is a flexible catheter that defines a channel or lumen 244. The channel 244 can be sized and shaped to receive the medical instrument 232 (e.g., via a proximal end 236 and/or an instrument port (not shown) of the elongate device 231) and facilitate delivery of the medical instrument 232 to a distal portion 238 of the elongate device 231. As shown, the elongate device 231 is coupled to the instrument body 235, which in turn is coupled and fixed relative to the instrument carriage 226 of the manipulator assembly 202.

In operation, for example, the manipulator assembly 202 can control insertion motion (e.g., proximal and/or distal motion along an axis A) of the elongate device 231 into the patient 203 via a natural or surgically created anatomic orifice of the patient 203 to facilitate navigation of the elongate device 231 through anatomic passageways of the patient 203 and/or to facilitate delivery of the distal portion 238 of the elongate device 231 to a target location within the patient 203. For example, the instrument carriage 226 and/or the insertion stage 228 may include actuators (not shown), such as servomotors, that facilitate control over motion of the instrument carriage 226 along the insertion stage 228. Additionally, or alternatively, the manipulator assembly 202 in some embodiments can control motion of the distal portion 238 of the elongate device 231 in multiple directions, including yaw, pitch, and roll rotational directions (e.g., to navigate patient anatomy). To this end, the elongate device 231 may house or include cables, linkages, and/or other steering controls (not shown) that the manipulator assembly 202 can use to controllably bend the distal portion 238 of the elongate device 231. For example, the elongate device 231 can house at least four cables that can be used by the manipulator assembly 202 to provide (i) independent "up-down" steering to control a pitch of the distal portion 238 of the elongate device 231 and (ii) independent "left-right" steering of the elongate device 231 to control a yaw of the distal portion 238 of the elongate device 231.

The medical instrument 232 of the medical instrument system 204 can be used for medical procedures, such as for survey of anatomical passageways, surgery, biopsy, ablation, illumination, irrigation, and/or suction. Thus, the medical instrument 232 can include image capture probes, biopsy instruments, laser ablation fibers, and/or other surgical, diagnostic, and/or therapeutic tools. For example, the medical instrument 232 can include an endoscope having one or more image capture devices 247 positioned at a distal portion 237 of and/or at other locations along the medical instrument 232. In these embodiments, the image capture device 247 can capture one or more real images or video (e.g., a sequence of one or more real navigation image frames) of anatomic passageways and/or other patient anatomy while the medical instrument 232 is within the anatomic region of the patient 203.

As discussed above, the medical instrument 232 can be deployed into and/or be delivered to a target location within the patient 203 via the channel 244 defined by the elongate device 231. In embodiments in which the medical instrument 232 includes an endoscope or other medical device having the image capture device 247 at the distal portion 237 of the medical instrument 232, the image capture device 247 can be advanced to the distal portion 238 of the elongate device 231 before, during, and/or after the manipulator assembly 202 navigates the distal portion 238 of the elongate device 231 to a target location within the patient 203. In these embodiments, the medical instrument 232 can be used as a survey instrument to capture real images and/or video of anatomic passageways and/or other patient anatomy, and/or to aid the operator (e.g., a physician) to navigate the distal portion 238 of the elongate device 231 through anatomic passageways to the target location.

As another example, after the manipulator assembly 202 positions the distal portion 238 of the elongate device 231 proximate a target location within the patient 203, the medical instrument 232 can be advanced beyond the distal portion 238 of the elongate device 231 to perform a medical procedure at the target location. Continuing with the above example, after all or a portion of the medical procedure at the target location is complete, the medical instrument 232 can be retracted back into the elongate device 231 and, additionally or alternatively, be removed from the proximal end 236 of the elongate device 231 or from another instrument port (not shown) along the elongate device 231.

In the example embodiment shown in FIG. 7, the sensor system 208 of the medical instrument system 204 includes a shape sensor 233 and a position measuring device 239. In some embodiments, the sensor system 208 includes all or a portion of the sensor system 108 of FIG. 6. In these and other embodiments, the shape sensor 233 of the sensor system 208 includes an optical fiber extending within and aligned with the elongate device 231. In one embodiment, the optical fiber of the shape sensor 233 has a diameter of approximately 200 µm. In other embodiments, the diameter of the optical fiber may be larger or smaller.

The optical fiber of the shape sensor 233 forms a fiber optic bend sensor that is used to determine a shape of the elongate device 231. In some embodiments, optical fibers having Fiber Bragg Gratings (FBGs) can be used to provide strain measurements in structures in one or more dimensions. Various systems and methods for monitoring the shape and relative position of an optical fiber in three dimensions are described in further detail in U.S. Patent Application Publication No. 2006-0013523 (filed Jul. 13, 2005) (disclosing fiber optic position and shape sensing device and method relating thereto); U.S. Pat. No. 7,781,724 (filed on Sep. 26, 2006) (disclosing fiber-optic position and shape sensing device and method relating thereto); U.S. Pat. No. 7,772,541 (filed on Mar. 12, 2008), (disclosing fiber-optic position and/or shape sensing based on Rayleigh scatter); and U.S. Pat. No. 6,389,187 (filed on Jun. 17, 1998) (disclosing optical fiber bend sensor), which are all incorporated by reference herein in their entireties. In these and other embodiments, sensors of the present technology may employ other suitable strain sensing techniques, such as Rayleigh scattering, Raman scattering, Brillouin scattering, and Fluorescence scattering. In these and still other embodiments, the shape of the elongate device 231 may be determined using other techniques. For example, a history of the pose of the distal portion 238 of the elongate device 231 can be used to reconstruct the shape of elongate device 230 over an interval of time.

In some embodiments, the shape sensor 233 is fixed at a proximal point 234 on the instrument body 235 of the medical instrument system 204. In operation, for example, the shape sensor 233 measures a shape in the medical instrument reference frame $(X_M, Y_M, Z_M)$ from the proximal point 234 to another point along the optical fiber, such as the distal portion 238 of the elongate device 231. The proximal point 234 of the shape sensor 233 may be movable along with instrument body 235 but the location of proximal point 234 may be known (e.g., via a tracking sensor or other tracking device).

The position measuring device 239 of the sensor system 208 provides information about the position of the instrument body 235 as it moves along the insertion axis A on the insertion stage 228 of the manipulator assembly 202. In some embodiments, the position measuring device 239 includes resolvers, encoders, potentiometers, and/or other sensors that determine the rotation and/or orientation of actuators (not shown) controlling the motion of the instrument carriage 226 of the manipulator assembly 202 and, consequently, the motion of the instrument body 235 of the medical instrument system 204.

Figure 8:
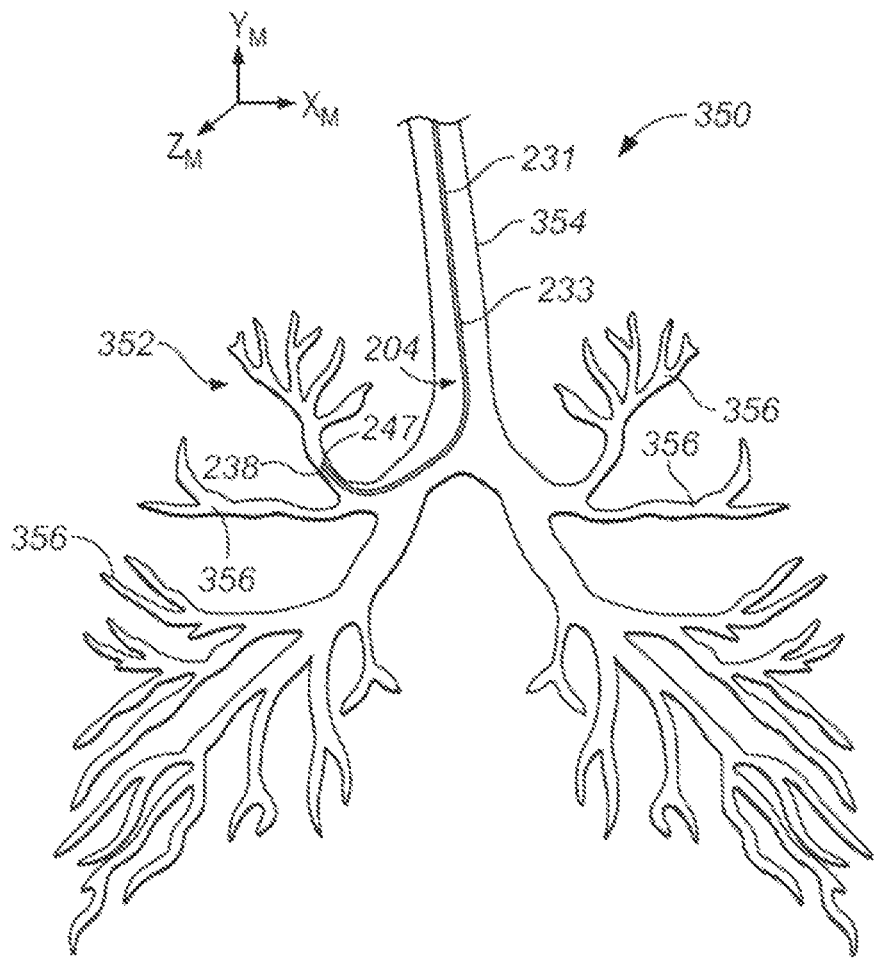
FIG. 8 shows an illustrative diagram of a portion of the medical instrument system of FIG. 7 extended within an anatomic region of a patient in accordance with various embodiments of the present technology.

FIG. 8 is a schematic representation of a portion of the medical instrument system 204 of FIG. 7 extended within an anatomic region 350 (e.g., human lungs) of the patient 203 in accordance with various embodiments of the present technology. In particular, FIG. 8 illustrates the elongate device 231 of the medical instrument system 204 extending within branched anatomic passageways 352 of the anatomic region 350. The anatomic passageways 352 include a trachea 354 and bronchial tubes 356.

As shown in FIG. 8, the elongate device 231 has a position, orientation, pose, and shape within the anatomic region 350, all or a portion of which (in addition to or in lieu of movement, such as speed or velocity) can be captured by the shape sensor 233 and/or the position measuring device 239 of the sensor system 208 to survey the anatomic passageways 352 of the anatomic region 350. In particular, the shape sensor 233 and/or the position measuring device 239 of the sensor system 208 can survey the anatomic passageways 352 by gathering positional information of the medical instrument system 204 within the anatomic region 350 in the medical instrument frame of reference $(X_M, Y_M, Z_M)$. The positional information may be recorded as a set of two-dimensional or three-dimensional coordinate points. In the example of the anatomic region 350 being human lungs, the coordinate points may represent the locations of the distal portion 238 of the elongate device 231 and/or other portions of the elongate device 231 while the elongate device 231 is advanced through the trachea 354 and the bronchial tubes 356. In these and other embodiments, the collection of coordinate points may represent the shape(s) of the elongate device 231 while the elongate device 231 is advanced through the anatomic region 350. In these and other embodiments, the coordinate points may represent positional data of other portions (e.g., the medical instrument 232) of the medical instrument system 104.

Figure 9:
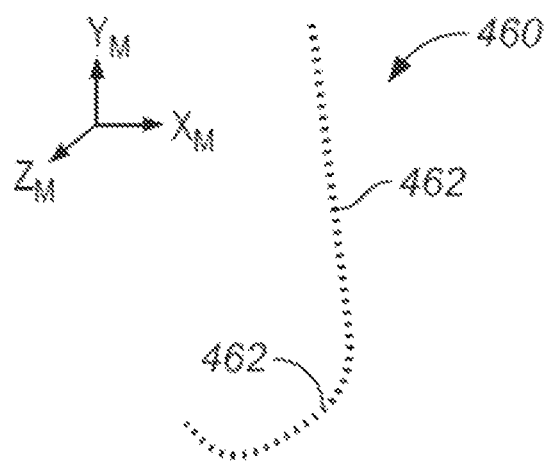
FIG. 9 shows a diagram illustrating a plurality of coordinate points that form a point cloud representing a shape of the portion of the medical instrument system of FIG. 8 extended within the anatomic region shown in FIG. 8.

The coordinate points may together form positional point cloud data. For example, FIG. 9 illustrates a plurality of coordinate points 462 forming positional point cloud data 460 representing a shape of the elongate device 231 while the elongate device 231 is within the anatomic region 350 (previously shown in FIG. 8) in accordance with various embodiments of the present technology. In particular, the positional point cloud data 460 is generated from the union of all or a subset of the recorded coordinate points 462 of the shape sensor 233 (previously shown in FIGS. 7 and 8) and/or of the position measuring device 239 (previously shown in FIG. 7) during a data acquisition period by the sensor system 208. The positional point cloud data 460 can be generated by implementation of the disclosed example embodiments of the method 1000.

In some embodiments, a point cloud (e.g., the point cloud 460) can include the union of all or a subset of coordinate points recorded by the sensor system 208 during an image capture period that spans multiple shapes, positions, orientations, and/or poses of the elongate device 231 within the anatomic region 350. In these embodiments, the point cloud can include coordinate points captured by the sensor system 208 that represent multiple shapes of the elongate device 231 while the elongate device 231 is advanced or moved through patient anatomy during the image capture period. Additionally, or alternatively, because the configuration, including shape and location, of the elongate device 231 within the patient 203 may change during the image capture period due to anatomical motion, the point cloud in some embodiments can comprise a plurality of coordinate points 462 captured by the sensor system 208 that represent the shapes of the elongate device 231 as the elongate device 231 passively moves within the patient 203. A point cloud of coordinate points captured by the sensor system 208 can be registered to different models or datasets of patient anatomy. For example, the positional point cloud data 460 can be used in registration with different models of the branched anatomic passageways 352.

Referring again to FIG. 7, the endoscopic imaging system 209 of the medical instrument system 204 includes one or more image capture devices configured to capture one or more images and/or video (e.g., a sequence of image frames) of anatomic passageways (e.g., the anatomic passageways 352 of FIG. 8) and/or other patient anatomy while the elongate device 231 and/or the medical instrument 232 is within the patient 203. For example, the endoscopic imaging system 209 can include (i) the image capture device 247 positioned at the distal portion 237 of the medical device 232 and/or (ii) one or more other image capture devices (not shown) positioned at other locations along the medical device 232. In these and other embodiments, the endoscopic imaging system 209 can include one or more image capture devices (not shown) positioned at the distal portion 238 and/or other locations along the elongate device 231. In some embodiments, the endoscopic imaging system 209 can include all or a portion of the endoscopic imaging system 109 of FIG. 6.

As shown in FIG. 8, the image capture device 247 of the medical instrument 234 is positioned at the distal portion 238 of the elongate device 231. In this embodiment, the image capture device 247 surveys the anatomic passageways 352 by capturing real images of the anatomic passageways 352 while the elongate device 231 is advanced through the trachea 354 and the bronchial tubes 356 of the anatomic region 350.

Figure 10:
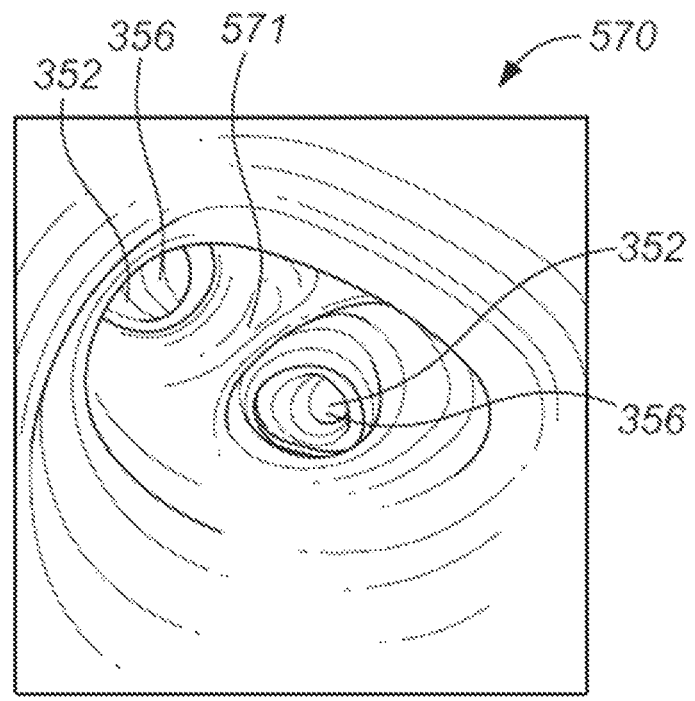
FIG. 10 shows a diagram illustrating a navigation image of real patient anatomy from a viewpoint of the portion of the medical instrument system of FIG. 8 extended within the anatomic region shown in FIG. 8.

FIG. 10 is an example of an endoscopic video image frame 570 (e.g., a real image, such as a still image, an image frame of a video, etc.) of patient anatomy of the anatomic region 350 such as the anatomic passageways 352 of FIG. 8 captured using the image capture device 247 of the medical instrument system 204. As shown, the real image 570 illustrates a branching point 571 of two bronchial tubes 356 (within the anatomic region 350 illustrated in FIG. 8) from a viewpoint of the medical instrument 232. In this example, the viewpoint is from the distal tip of the medical instrument 232, such that the medical instrument 232 is not visible within the real image 570. In other embodiments, the image capture device 247 can be positioned at another location along the medical instrument 232 and/or along the elongate device 231 such that the real image 570 is taken from another viewpoint of the medical instrument 232 and/or from another viewpoint of the elongate device 231. A portion of the medical device 232 and/or of the elongate device 231 may be visible within the real image 570 depending on the positions of the medical instrument 232 and the elongate device 231 relative to one another.

Referring again to FIG. 7, the real images captured by the endoscopic imaging system 209 can facilitate navigation of the distal portion 238 of the elongate device 231 through anatomic passageways (e.g., the anatomic passageways 352 of FIG. 8) of the patient 203 and/or delivery of the distal portion 238 of the elongate device 231 to a target location within the patient 203. In these and other embodiments, the real images captured by the endoscopic imaging system 209 can facilitate (i) navigation of the distal portion of the medical instrument 232 beyond the distal portion 238 of the elongate device 231, (ii) delivery of the distal portion of the medical instrument 232 to a target location within the patient 203, and/or (iii) visualization of patient anatomy during a medical procedure. In some embodiments, each real image captured by the endoscopic imaging system 209 can be associated with a time stamp and/or a position within an anatomic region of the patient 203.

As illustrated in FIG. 7, the imaging system 218 can be arranged near the patient 203 to obtain three-dimensional images of the patient 203. In some embodiments, the imaging system 218 includes one or more imaging technologies, including CT, MRI, fluoroscopy, thermography, ultrasound, OCT, thermal imaging, impedance imaging, laser imaging, nanotube X-ray imaging, and/or the like. The imaging system 218 is configured to generate image data of the patient 203 before, during, and/or after the elongate device 231 is extended within the patient 203. Thus, the imaging system 218 can be configured to capture preoperative, intraoperative, and/or postoperative three-dimensional images of the patient 203. In these and other embodiments, the imaging system 218 may provide real-time or near real-time images of the patient 203.

Figure 11:
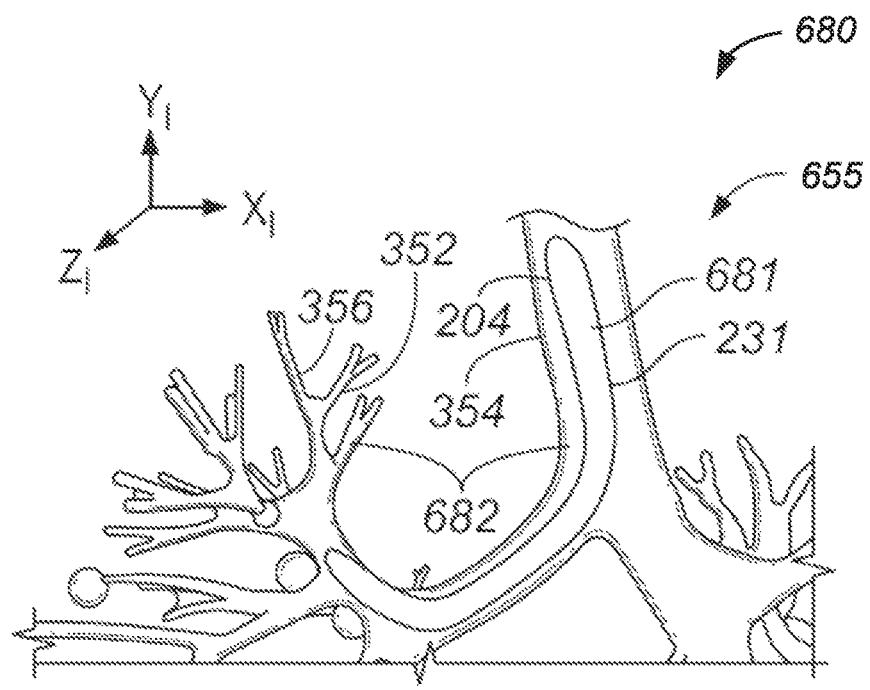
FIG. 11 shows a diagram illustrating an intra-operative image of a portion of the anatomic region of FIG. 8 while the portion of the medical instrument system of FIG. 8 is extended within the anatomic region.

FIG. 11 illustrates such intra-operative image data 680 of a portion 655 of the anatomic region 350 of FIG. 8 captured during an image capture period by the imaging system 218 while the elongate device 231 of the medical instrument system 204 is extended within the anatomic region 350. As shown, the image data 680 includes graphical elements 681 representing the elongate device 231 and graphical elements 682 representing the anatomical passageways 352 of the anatomic region 350.

All or a portion of the graphical elements 681 and 682 of the image data 680 can be segmented and/or filtered to generate (i) a three-dimensional model of the anatomical passageways 352 of the portion 655 of the anatomic region 350, and/or (ii) an image point cloud of the elongate device 231 within the anatomic region 350. During the segmentation process, pixels or voxels generated from the image data 680 may be partitioned into segments or elements or be tagged to indicate that they share certain characteristics or computed properties such as color, density, intensity, and texture. The segments or elements may then be converted to a model and/or a point cloud. Additionally, or alternatively, the segments or elements can be used to locate (e.g., calculate) and/or define a center line running along the anatomical passageways 352. The generated anatomic models and/or point clouds may be two or three-dimensional and may be generated in an image reference frame $(X_1, Y_1, Z_1)$.

As discussed above with respect to FIG. 6, the display system 110 of the medical system 100 can display various images or representations of patient anatomy and/or of the medical instrument system 104 based on data captured and/or generated by the positional sensor system 108, by the endoscopic imaging system 109, by the imaging system 118, and/or by the virtual visualization system 115. In various implementations, the images and/or representations can be utilized by the system to aid the operator 105 in conducting an image-guided medical procedure.

Figure 12:
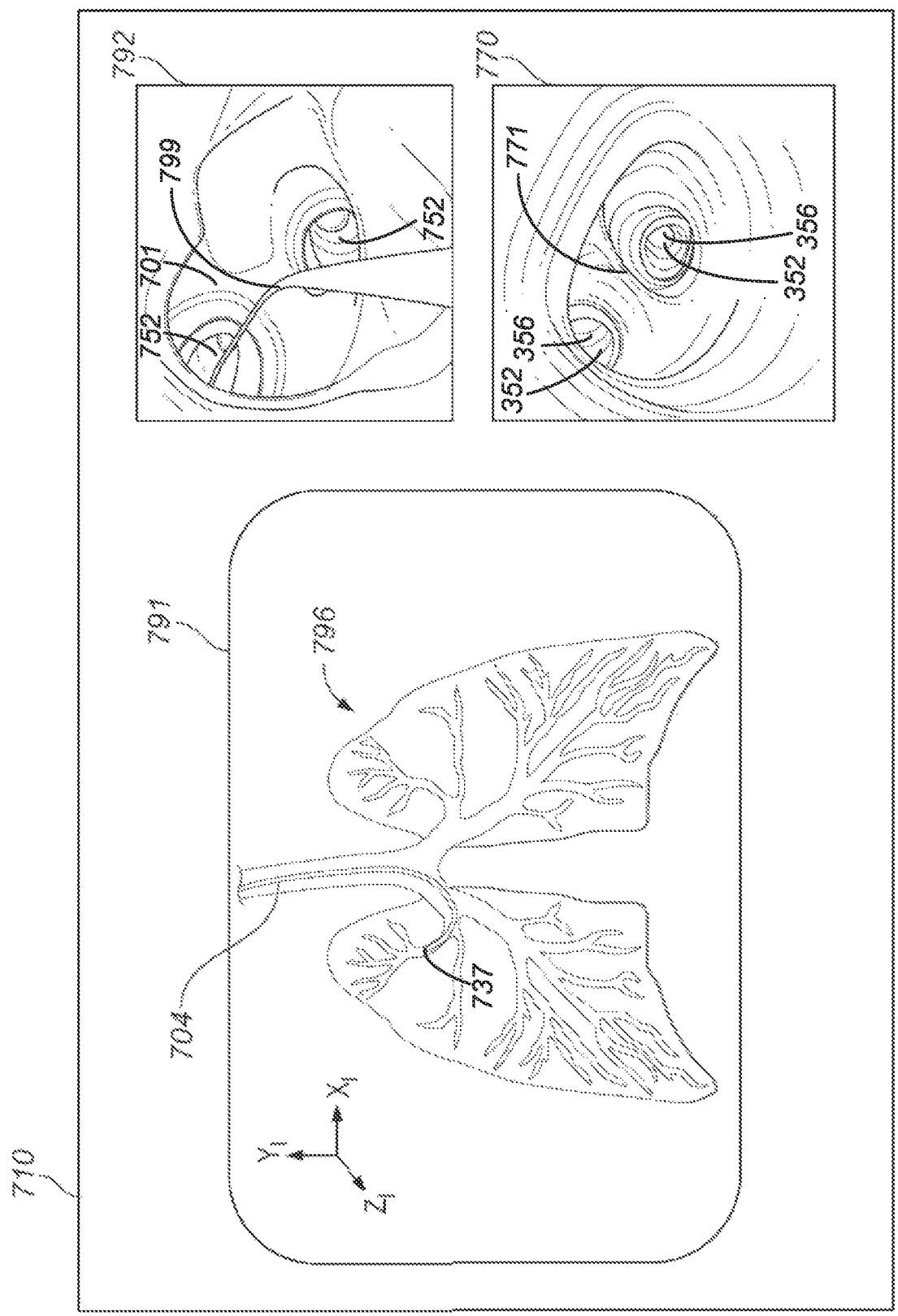
FIG. 12 shows a diagram of a display system displaying a composite virtual navigational image in which the medical instrument system of FIGS. 7 and 8 is registered to an anatomic model of the anatomic region of FIG. 8, a virtual navigational image of the virtual patient anatomy, and a real navigational image of the real patient anatomy within the anatomic region in accordance with various embodiments of the present technology.

FIG. 12 is a schematic representation of an example display 710 produced by the display system 110 in accordance with various embodiments of the present technology. As shown, the display 710 includes a real navigational image 770, a composite virtual navigational image 791 (also referred to as "composite virtual image 791"), and a virtual navigational image 792. The real navigational image 770 can be substantially the same as the real navigational image 570 of FIG. 10. Thus, for example, the real navigational image 770 can be captured by the endoscopic imaging system 109 (FIG. 7) and provided to the display system 110 to be presented on the display 710 in real-time or near real-time. In the illustrated embodiment, the real navigational image 770 illustrates real patient anatomy, e.g., such as a real image of a branching point or carina 771 at which an anatomic passageway branches into the two bronchial tubes 356 and/or anatomic passageways 352) from a viewpoint oriented distally away from the distal portion 237 of the medical instrument 232.

The composite virtual image 791 of FIG. 12 is displayed in the image reference frame $(X_1, Y_1, Z_1)$ and includes an anatomic model 796 generated from image data (e.g., of the anatomic region 350 of FIG. 8) captured by the imaging system 118. The anatomic model 796 is registered (i.e., dynamically referenced) with a point cloud of coordinate points (e.g., the point cloud 460 of FIG. 9) generated by the positional sensor system 108 to display a representation 704 within the anatomic model 796 of the tracked position, shape, pose, orientation, and/or movement of embodiments of the medical instrument system 104 (e.g., such as of the elongate device 231 of FIG. 7) within the patient 103. In some embodiments, the composite virtual image 791 is generated by the virtual visualization system 115 (FIG. 6) of the control system 112 (FIG. 6). Generating the composite virtual image 791 involves registering the image reference frame ($X_1, Y_1, Z_1$) with the surgical reference frame ($X_S, Y_S, Z_S$) and/or to the medical instrument reference frame ($X_M, Y_M, Z_M$). This registration may rotate, translate, or otherwise manipulate by rigid and/or non-rigid transforms coordinate points of the point cloud (e.g., the coordinate points 462 of the point cloud 460 of FIG. 9) captured by the positional sensor system 108 to align the coordinate points with the anatomic model 796. The registration between the image and surgical/instrument frames of reference may be achieved, for example, by using a point-based iterative closest point (ICP) technique as described in U.S. Provisional Pat. App. Nos. 62/205,440 and No. 62/205,433, which are both incorporated by reference herein in their entireties. In other embodiments, the registration can be achieved using another point cloud registration technique.

Based at least in part on the registration, the virtual visualization system 115 can additionally or alternatively generate virtual navigational images (e.g., the virtual navigational image 792) that include a virtual depiction of patient anatomy from a viewpoint of a virtual camera on the representation 704 of the medical instrument system 104 (FIG. 9) within the anatomic model 796. In the embodiment illustrated in FIG. 12 of the representation 704 of the medical instrument system 204 shown in FIG. 7, the virtual camera is positioned at the distal portion 737 of representation 704 (e.g., of the medical instrument 232) such that (i) the viewpoint of the virtual navigational image 792 (shown in FIG. 12) is directed distally away from the distal portion 737 of the representation 704 and (ii) the representation 704 is not visible within the virtual navigational image 792. In other embodiments, the virtual visualization system 115 can position the virtual camera (i) at another location along the representation 704 and/or (ii) in a different orientation such that the virtual navigational image 792 has a corresponding virtual viewpoint. In some embodiments, depending on the position and orientation of the virtual camera and the positions of the elongate device 231 and the medical instrument 232 relative to one another when within the patient 103, the virtual visualization system 115 can render a virtual representation (not shown) of at least a portion of the elongate device 231 and/or of the medical instrument 232 into the virtual navigational image 792.

In some embodiments, the virtual navigational image 792 can optionally include a navigation stripe 799. In some implementations, for example, the navigation stripe 799 is used to aid the operator 105 to navigate the medical instrument system 104 through anatomic passageways to a target location within a patient 103. For example, the navigation stripe 799 can illustrate a "best" path through patient anatomy for the operator 105 to follow to deliver the distal portions 237 and/or 238 of the medical instrument 232 and/or of the elongate device 231, respectively, to a target location within an anatomic region. In some embodiments, the navigation stripe 799 can be aligned with a centerline of or another line along (e.g., the floor of) a corresponding anatomic passageway.

In some embodiments, the virtual visualization system 115 can place the virtual camera within the anatomic model 796 at a position and orientation corresponding to the position and orientation of the image capture device 247 within the patient 103. As further shown in FIG. 12, the virtual navigational image 792 illustrates virtual patient anatomy from substantially the same location at which the real navigational image 770 is captured by the image capture device 247, e.g., showing carina 701 marking a branching point of two anatomic passageways 752 of the anatomic model 796. Thus, the virtual navigational image 792 provides a rendered estimation of patient anatomy visible to the image capture device 247 at a given location within the anatomic region 350 of FIG. 8. Because the virtual navigational image 792 is based on the registration of a point cloud generated by the positional sensor system 108 and image data captured by the imaging system 118, the correspondence between the virtual navigational image 792 and the real navigational image 770 provides insight regarding the accuracy and/or efficiency of the registration and can be used to improve the registration, as described in greater detail below. Furthermore, the real navigational images (e.g., the real navigational images 570 and 770) captured by the endoscopic imaging system 109 can (a) provide information regarding the position and orientation of the medical instrument system 104 within the patient 103, (b) provide information regarding portions of an anatomic region actually visited by the medical instrument system, and/or (c) help identify patient anatomy (e.g., branching points or carinas of anatomic passageways) proximate the medical instrument system 104, any one or more of which can be used to improve the accuracy and/or efficiency of the registration as described in greater detail below.

EXAMPLES

Several aspects of the present technology are set forth in the following examples. Although several aspects of the present technology are set forth in examples directed to systems, computer-readable mediums, and methods, any of these aspects of the present technology can similarly be set forth in examples directed to any of systems, computer-readable mediums, and methods in other embodiments.

In some embodiments in accordance with the present technology (example 1), a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with one or both of the detected position and the detected motion of the medical device; analyzing a set of the received data points to determine a motion parameter associated with a movement or change in position of the sensor of the medical device in a region of the anatomic passageway, wherein the motion parameter includes a change of one or both of a translational motion and a rotational motion of the sensor; comparing the motion parameter to a threshold to determine whether to accept the set of data points when the motion parameter satisfies the threshold or to reject the set of data points when the motion parameter does not satisfy the threshold; and recording the accepted set of data points in a survey point cloud usable to register the medical device in an anatomic frame of reference space.

Example 2 includes the system of any of examples 1, 3, 4 or 5 wherein the sensor is configured to generate one or both of position sensor data and motion sensor data during data sampling of the anatomic passageway of the patient, wherein the position sensor data is associated with one or more positions of the medical device within the anatomic passageway, and wherein the motion sensor data is associated with one or both of the translational motion and the rotational motion of the medical device within the anatomic passageway.

Example 3 includes the system of any of examples 1, 2, 4 or 5 wherein the change of one or both of the translational motion and rotational motion of the sensor includes a change in one or more of (i) a roll value, (ii) a pitch value, or (iii) a yaw value.

Example 4 includes the system of any of examples 1, 2, 3 or 5 wherein the threshold includes a motion value or a range of motion values associated with the one or both of the translational motion and the rotational motion of the sensor.

Example 5 includes the system of any of examples 1, 2, 3, or 4 wherein the system is configured to perform further operations include generating a registration between the accepted set of data points in the survey point cloud and image data points derived from a previously-acquired image of the anatomic passageway of the patient.

In some embodiments in accordance with the present technology (example 6), a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a distance parameter associated with a distance between a data point and one or more nearest neighbors of the data point; comparing the distance parameter to a threshold to determine whether to accept the data point among the received data points when the distance parameter satisfies the threshold or to reject the data point among the received data points when the distance parameter does not satisfy the threshold; and recording accepted data points in a survey point cloud usable to register the medical device in an anatomic frame of reference space.

Example 7 includes the system of any of examples 6, 8, 9 or 10 wherein the threshold includes a distance value or a range of distance values.

Example 8 includes the system of any of examples 6, 7, 9 or 10 wherein the received data points are initially recorded in the survey point cloud, and the recording the accepted data points in the survey point cloud includes deleting rejected data points that do not satisfy the threshold.

Example 9 includes the system of any of examples 6, 7, 8 or 10 wherein the system is configured to perform further operations that include storing the received data points in a temporary storage, and deleting rejected data points that do not satisfy the threshold from the temporary storage.

Example 10 includes the system of any of examples 6, 7, 8 or 9 wherein the system is configured to perform further operations include generating a registration between the recorded non-rejected data points in the survey point cloud and image data points derived from a previously-acquired image of the anatomic passageway of the patient.

In some embodiments in accordance with the present technology (example 11), a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a density parameter associated with a density of one or more data points to nearest neighbors data points; comparing the density parameter to a threshold to determine whether to accept the one or more data points among the analyzed data points when the density parameter satisfies the threshold or to reject the one more data points when the density parameter does not satisfy the threshold; and recording accepted data points in a survey point cloud usable to register the medical device in an anatomic frame of reference space.

Example 12 includes the system of any of examples 11, 13, 14 or 15 wherein the threshold includes a density value or a range of density values.

Example 13 includes the system of any of examples 11, 12, 14 or 15 wherein the received data points are initially recorded in the survey point cloud, and the recording the accepted data points in the survey point cloud includes deleting rejected data points that do not satisfy the threshold.

Example 14 includes the system of any of examples 11, 12, 13 or 15 wherein the system is configured to perform further operations that include storing the received data points in a temporary storage, and deleting rejected data points that do not satisfy the threshold from the temporary storage.

Example 15 includes the system of any of examples 11, 12, 13 or 14 wherein the system is configured to perform further operations that include generating a registration between the recorded non-rejected data points in the survey point cloud and image data points derived from a previously-acquired image of the anatomic passageway of the patient.

In some embodiments in accordance with the present technology (example 16), a system for mitigating oversampling of data points includes a medical device comprising a sensor, wherein the medical device is insertable in an anatomic passageway of a patient such that the sensor is operable to detect one or both of a position and a motion of the medical device when inserted in the anatomic passageway; and a computing device in communication with the medical device, the computing device comprising a processor, and a memory coupled to the processor and storing instructions that, when executed by the processor, cause the system to perform operations comprising: receiving data points detected by the sensor of the medical device, the received data points associated with a detected position of the medical device; analyzing the received data points to determine a density parameter associated with a density of one or more data points to nearest neighbors data points; comparing the density parameter to a threshold to determine whether to alter a weighting value of the one or more data points within the analyzed data points; when the density parameter meets the threshold, altering the weighting value of the one or more data points; and recording the data points to register the medical device in an anatomic frame of reference space.

Example 17 includes the system of any of examples 16, 18, 19 or 20 wherein the threshold includes a density value or a range of density values.

Example 18 includes the system of any of examples 16, 17, 19 or 20 wherein the altering the weighting value includes normalizing the weighting values.

Example 19 includes the system of any of examples 16, 17, 18 or 20 wherein the system is configured to perform further operations that include generating a registration between the recorded non-rejected data points in the survey point cloud and image data points derived from a previously-acquired image of the anatomic passageway of the patient.

Example 20 includes the system of any of examples 16, 17, 18 or 19 wherein the anatomic passageway includes pulmonary airway passages of lungs.

Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments can perform steps in a different order. Furthermore, the various embodiments described herein can also be combined to provide further embodiments.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

From the foregoing, it will also be appreciated that various modifications can be made without deviating from the technology. For example, various components of the technology can be further divided into subcomponents, or various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A system for mitigating oversampling of data points, the system comprising:
    a medical device comprising a sensor, wherein the medical device is insertable in an anatomic passageway of a patient such that the sensor is operable to detect one or both of a position and a motion of the medical device when inserted in the anatomic passageway; and
    a computing device in communication with the medical device, the computing device comprising a processor, and a memory coupled to the processor and storing instructions that, when executed by the processor, cause the system to perform operations comprising:
        receiving data points detected by the sensor of the medical device, the received data points associated with one or both of the detected position and the detected motion of the medical device;
        analyzing a set of the received data points to determine a motion parameter associated with a movement or change in position of the sensor of the medical device in a region of the anatomic passageway, wherein the motion parameter includes a change of one or both of a translational motion and a rotational motion of the sensor, wherein determining the motion parameter comprises determining a distance between each data point in the set of data points and its preceding data point in the set of data points;
        comparing the distance between each data point and its preceding data point to a threshold to determine whether to accept each respective data point of the set of data points when the distance satisfies the threshold or to reject each respective data point of the set of data points when the distance does not satisfy the threshold; and
        recording the accepted set of data points in a survey point cloud usable to register the medical device in an anatomic frame of reference space.

2. The system of claim 1 wherein the sensor is configured to generate one or both of position sensor data and motion sensor data during data sampling of the anatomic passageway of the patient, wherein the position sensor data is associated with one or more positions of the medical device within the anatomic passageway, and wherein the motion sensor data is associated with one or both of the translational motion and the rotational motion of the medical device within the anatomic passageway.

3. The system of claim 1 wherein the change of one or both of the translational motion and rotational motion of the sensor includes a change in one or more of (i) a roll value, (ii) a pitch value, or (iii) a yaw value.

4. The system of claim 1 wherein the threshold includes a motion value or a range of motion values associated with the one or both of the translational motion and the rotational motion of the sensor.

5. The system of claim 4 wherein the motion value is a velocity value, and wherein the range of motion values is a range of velocity values.

6. The system of claim 1 wherein the system is configured to perform further operations include generating a registration between the accepted set of data points in the survey point cloud and image data points derived from a previously-acquired image of the anatomic passageway of the patient.

7. The system of claim 1 wherein the received data points are associated with one or both of a detected position and a detected motion of a distal tip of the medical device when inserted in the anatomic passageway.

8. A non-transitory machine-readable medium storing instructions that, when run by one or more processors, cause the one or more processors to:
    receive data points detected by a sensor of a medical device insertable in an anatomic passageway of a patient, the received data points associated with one or both of a detected position and a detected motion of the medical device when inserted in the anatomic passageway;
    analyze a set of the received data points to determine a motion parameter associated with a movement or change in position of the sensor of the medical device in a region of the anatomic passageway, wherein the motion parameter includes a change of one or both of a translational motion and a rotational motion of the sensor, wherein determining the motion parameter comprises determining a distance between each data point in the set of data points and its preceding data point in the set of data points;
    compare the distance between each data point and its preceding data point to a threshold to determine whether to accept each respective data point of the set of data points when the distance satisfies the threshold or to reject each respective data point of the set of data points when the distance does not satisfy the threshold; and
    record the accepted set of data points in a survey point cloud usable to register the medical device in an anatomic frame of reference space.

9. The non-transitory machine-readable medium of claim 8 wherein the instructions further cause the one or more processors to:
    receive from the sensor one or both of position sensor data and motion sensor data during data sampling of the anatomic passageway of the patient, wherein the position sensor data is associated with one or more positions of the medical device within the anatomic passageway, and wherein the motion sensor data is associated with one or both of the translational motion and the rotational motion of the medical device within the anatomic passageway.

10. The non-transitory machine-readable medium of claim 8 wherein the change of one or both of the translational motion and rotational motion of the sensor includes a change in one or more of (i) a roll value, (ii) a pitch value, or (iii) a yaw value.

11. The non-transitory machine-readable medium of claim 8 wherein the threshold includes a motion value or a range of motion values associated with the one or both of the translational motion and the rotational motion of the sensor.

12. The non-transitory machine-readable medium of claim 11 wherein the motion value is a velocity value, and wherein the range of motion values is a range of velocity values.

13. The non-transitory machine-readable medium of claim 8 wherein the instructions further cause the one or more processors to:
generate a registration between the accepted set of data points in the survey point cloud and image data points derived from a previously-acquired image of the anatomic passageway of the patient.

14. The non-transitory machine-readable medium of claim 8 wherein the received data points are associated with one or both of a detected position and a detected motion of a distal tip of the medical device when inserted in the anatomic passageway.

15. A method for mitigating oversampling of data points, the method comprising:
receiving data points detected by a sensor of a medical device insertable in an anatomic passageway of a patient, the received data points associated with one or both of a detected position and a detected motion of the medical device when inserted in the anatomic passageway;
analyzing a set of the received data points to determine a motion parameter associated with a movement or change in position of the sensor of the medical device in a region of the anatomic passageway, wherein the motion parameter includes a change of one or both of a translational motion and a rotational motion of the sensor, wherein determining the motion parameter comprises determining a distance between each data point in the set of data points and its preceding data point in the set of data points;
comparing the distance between each data point and its preceding data point to a threshold to determine whether to accept each respective data point of the set of data points when the distance satisfies the threshold or to reject each respective data point of the set of data points when the distance does not satisfy the threshold; and
recording the accepted set of data points in a survey point cloud usable to register the medical device in an anatomic frame of reference space.

16. The method of claim 15 further comprising:
receiving from the sensor one or both of position sensor data and motion sensor data during data sampling of the anatomic passageway of the patient, wherein the position sensor data is associated with one or more positions of the medical device within the anatomic passageway, and wherein the motion sensor data is associated with one or both of the translational motion and the rotational motion of the medical device within the anatomic passageway.

17. The method of claim 15 wherein the change of one or both of the translational motion and rotational motion of the sensor includes a change in one or more of (i) a roll value, (ii) a pitch value, or (iii) a yaw value.

18. The method of claim 15 wherein the threshold includes a motion value or a range of motion values associated with the one or both of the translational motion and the rotational motion of the sensor.

19. The method of claim 15 further comprising:
generating a registration between the accepted set of data points in the survey point cloud and image data points derived from a previously-acquired image of the anatomic passageway of the patient.

20. The method of claim 15 wherein the received data points are associated with one or both of a detected position and a detected motion of a distal tip of the medical device when inserted in the anatomic passageway.

* * * * *